(12) United States Patent
Dehlin

(10) Patent No.: US 7,466,308 B2
(45) Date of Patent: Dec. 16, 2008

(54) DISPOSING IDENTIFYING CODES ON A USER'S HAND TO PROVIDE INPUT TO AN INTERACTIVE DISPLAY APPLICATION

(75) Inventor: Joel P. Dehlin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 914 days.

(21) Appl. No.: 10/879,905

(22) Filed: Jun. 28, 2004

(65) Prior Publication Data

US 2006/0007124 A1    Jan. 12, 2006

(51) Int. Cl.
*G09G 5/00* (2006.01)
(52) U.S. Cl. .................... 345/175; 178/18.09
(58) Field of Classification Search ............... 345/173, 345/175; 178/18.03, 18.09
See application file for complete search history.

(56) References Cited

U.S. PATENT DOCUMENTS

| | | | | |
|---|---|---|---|---|
| 4,992,650 | A | 2/1991 | Somerville | 235/462 |
| 6,707,444 | B1 * | 3/2004 | Hendriks et al. | 345/156 |
| 6,850,162 | B2 * | 2/2005 | Cacioli et al. | 340/573.1 |

OTHER PUBLICATIONS

"3.6 Interpolation in Two or More Dimensions." Numerical Recipes in C: The Art of Scientific Computing. Chapter 3. Interpolation and Extrapolation. © 1988-1992, Cambridge University Press. Numerical Recipes Software, pp. 123-128.
"Bar Code 1,2-Dimensional Bar Code Page." Available http://www.adams1.com/pub/russadam/stack.html. Printed Jan. 20, 2004. 14pp.
Ambiente article. "InteracTable®." Dated Jul. 7, 2000. Available http://www.darmstadt.gmd.de/ambiente/activities/interactable.html. Printed Nov. 21, 2003. 3pp.
Bier, Stone, Pier, Buston, and DeRose. "Toolglass and Magic Lenses: The See-Through Interface." *Proceedings of Siggraph '93* (Anaheim, Aug.). Computer Graphics Annual Conference Series, ACM, 1993, pp. 73-80. 8pp.
Blickenstorfer, Conrad H. "First Look: Acer TravelMate TM100 with Windowes XP Tablet PC Edition." Pen Computing magazine, Jul. 2002, pp. 44-47.

(Continued)

*Primary Examiner*—Richard Hjerpe
*Assistant Examiner*—Tom V Sheng
(74) *Attorney, Agent, or Firm*—Workman Nydegger

(57) ABSTRACT

Input for controlling an application is provided to a computer system having an interactive display surface with an optical vision system for sensing objects. An optical code selected to be detectable by the interactive display surface when positioned adjacent to the interactive display surface is associated with a control function. The optical code is provided on an article configured to be removably affixed to at least a portion of a user's hand. When the portion of the user's hand is moved to a position adjacent to the interactive display surface, the optical vision system detects the optical code and invokes the control function associated with the optical code. Thus, a user can provide input to the interactive display surface with movements of the user's hand. A different optical code may be affixed to each digit of the user's hand, enabling the user to selectively invoke a plurality of control functions.

32 Claims, 14 Drawing Sheets

OTHER PUBLICATIONS

"DiamondSpin - Begs for Direct Manipulation Technology Is it the Pen? Sony Leaps Out-of-the-Box Again with Gummi." Mitsubishi-DiamondSpin. CHI 2004 #3. Printed Apr. 30, 2004. 5pp.

Dietz and Leigh. "DiamondTouch: A Multi-User Touch Technology." UIST'01 Orlando FLA. © ACM 2001 1-58113-438 -x/01/11. CHI Letters 3 (2). Nov. 11-14, 2001. pp. 219-226.

Electronic Check Alliance Processing, Inc. "Gift cards, How Stored Value Card Systems Work." Available. http://www.electron-cap.com/GiftCards.htm. Printed Jan. 20, 2004 and May 16, 2004. ©2003. 2pp. total (3pp printed).

Fukuchi and Rekimoto. "Interaction Techniques for SmartSkin." *ACM UIST2002 demonstration*, 2002. 2pp.

Grabowski, Robert. "A Miniature Video Laser Range Finder for Small Robots." Available http://www.andrew.cmu.edu/~rjg/research/research_hardware/laser_rangfinder.html. Printed May 16, 2004. 8pp.

Grant and Winograd. "Flexible, Collaborative Organization on a Tabletop." *ACM CSCW 002: Workshop on Co-located Tabletop Collaboration: Technologies and Directions*. New Orleans, LA. Nov. 2002. pp. 1-4.

Horn, Berthold K. P. "Robot Vision." The MIT Press. Available http://mitpress.mit.edu/catalog/item/default.asp?ttype=2&tid=8388. Printed Dec. 17, 2003. 6pp. total.

Horn, Berthold Klaus Paul. "Robot Vision." Binary Images: Topological Properties. The MIT Electrical Engineering and Computer Science Series. 1986. pp. 66-71 and cover page(s).

Hunter, Andrew. "Connected Components Analysis (Computer Vision)." www.google.com search results http://www.google.com/saerch?sourceid=navclient&q=connected+component+ellipse. Printed Mar. 7, 2004. Article dated Sep. 24, 2002. 2pp search results, 21pp article.

"IR Distance Sensor." Available http://www.diyelectronics.com/Accessories/IRDS.html (2pp) and http://www.diyelectronics.com/Accessories/GP2D05.html (1pg). Printed Dec. 30, 2003. 3pp.

Ishii and Ullmer. "Tangible Bits: Towards Seamless Interfaces between People, Bits and Atoms." *Proceedings of CHI '97*, Mar. 22-27, 1997, Atlanta, Georgia. © 1997 ACM 0-89791-802-9/97/03. pp. 1-8.

Ishii, Wisneski, Orbanes, Chun, and Paradiso. "PingPongPlus: Design of an Athletic-Tangible Interface for Computer-Supported Cooperative Play." *Proceedings of CHI '99*, May 15-20, 1999, © 1999 ACM.pp. 1-8.

Johanson, Kolodny, and Russell. "A Hand pose and Position Tracker for the Interactive Table." CS223B Final Project. Available http://graphics.stanford.edu/~drussel/vision/tracker-report.html. Printed Dec. 16, 2003, 6pp.

Ju, Hurwitz, Judd, and Lee. "CounterActive: An Interactive Cookbook for the Kitchen Counter." *Extended Abstracts of CHI 2001*, Seattle. Apr. 2001. pp. 269-270.

Kang, Sing Bing. "Radial Distortion Snakes." *IAPR Workshop on Machine Vision Applications (MVA2000)*, Tokyo, Japan. Nov. 2000, pp. 603-606.

Kato, Billinghurst, Poupyrev, Imamoto, and Tachibana. "Virtual Object Manipulation on a Table-Top AR Environment." *IEEE and ACM Int'l Symposium on Augmented Reality 2000, ISAR'2000*, Oct. 5-6, 2000, Munich. 9pp.

Klemmer, Newman, and Sapien. "The Designer's Outpost: A Task-Centered Tangible Interface for Web Site Information Design." *Proceedings of Human Factors in Computing System: CHI2000 Extended Abstracts*. The Hauge, The Netherlands. Apr. 1-6, 2000, pp. 333-334.

Klemmer, Newman, Farrell, Bilezikjian, and Landay. "The Designers' Outpost: A Tangible Interface for Collaborative Web Site Design." *CHI Letters, The 14$^{th}$ Annual ACM Symposium on User Interface Soft Technology: UIST 2001*. 3(2). pp. 1-10.

Kobayashi, Hirano, Narita, and Ishii. "A Tangible Interface for IP Network Simulation." *CHI 2003*, Apr. 5-10, 2003, Ft. Lauderdale, FL ACM 1-58113-630-7/30/0004. 2pp.

Koike, Sato, and Kobayasji. "Integrating Paper and Digital Information on EnhancedDesk: A Method for Realtime Finger Tracking on an Augmented Desk System." *ACM Transaction on Computer-Human Interaction*, vol. 8, No. 4, Dec. 2001. © 2001 ACM 1073-0516/01/1200-0307. pp. 307-322.

Leibe, Starner, Ribarsky, Wartell, Krum, Singletary, and Hodges. "The Perceptive workbench: Toward Spontaneous and Natural Interaction In Semi-Immersive Virtual Environments." *Proceedings of the IEEE Virtual Reality 2000 Conference*, Mar. 18-22, 2000. New Brunswick, New Jersey: IEEE Computer Society, 2000. 8pp.

Leigh and Dietz. "DiamondTouch Characteristics and Capabilties." Mitsubishi Electric Research Laboratories, Cambridge, Massachusetts, USA. Undated. 2pp.

Magerkurth, Stenzel, and Prante. "STARS - A Ubiquitous Computing Platform for Computer Augmented Tabletop Games." *5$^{th}$ International Conference on Ubiquitous Computing (Ubicomp '03)*, Oct. 12-15, 2003, Seattle, Washington. 2pp.

Malandain, Grégoire. "Connected Components Extraction." Available http://www-sop.inria.fr/epidaure/personnel/malandain/segment/connexe.html. Printed Dec. 18, 2003. 3pp.

Matsushita and Rekimoto. "HoloWall: Designing a Finger, Hand, Body, and Object Sensitive Wall." *UIST '97* Banff, Alberta, Canada. © 1997 ACM 0-89791-881-9/97/10. pp. 209-210.

Missouri Department Of Revenue. "2D Barcode Technology." Undated 3pp.

Moran, Saund, van Melle, Gujar, Fishkin, and Harrison. "Design and Technology for Collaborage; Collaborative collages of Information on Physical Walls." *UIST '99*. Ashville, NC. © 1999 ACM 1-58113-075-9/99/11, CHI Letters vol. 1, 1.pp. 197-206.

Pangaro, Maynes-Aminzade, and Ishii. "The Actuated Workbench: Computer-Controlled Actuation in Tabletop Tangible Interfaces." *Proceedings of UIST 2002*, OCt. 27-30, 2002. ©2002 ACM. 10pp.

Paradiso, Hsiao, Stricko, Lifton, and Adler. "Sensor Systems for interactive surfaces." *IBM systems Journal*, vol. 39, Nos. 3 & 4, 2000. pp. 892-914.

Patten, Ishii, Hines, and Pangaro. "Sensetable: A Wireless Object Tracking Platform for Tangible User Interfaces." *Proceedings of CHI 2001*, Mar. 31-Apr. 5, 2001, ACM Press, ©2001 ACM. 8pp.

Patten, Recht, and Ishii. "Audiopad: A Tag-based Interface for Musical Performance." *Proceedings of Conference on New Interface for Musical Expression (NIME '02)*. Dublin, Ireland, may 24-36, 2002. 6pp.

Ramos and Balakrishnan. "Fluid Interaction Techniques for the Control and Annotation of Digital Video." *UIST +03* Vancouver, B.C., Canada. ©2003 ACM 1-58113-636-06/03/0010. pp. 105-114.

Rekimoto and Ayatsuka. "CyberCode: Designing Augmented Reality Environments with Visual Tags." *Proc. of UIST 2000*, 2000. 10pp.

Rekimoto and Matsushita. "Perceptual Surfaces:Towards a Human and Object Sensitive Interactive Display." *Proceedings of Workshop on Perceptural User Interactes (PUI'97)*, 1997. 3pp.

Rekimot and Nagao. "The World through the Computer: Computer Augmented Interaction with Real World Environments." *Proceedings of UIST'95*, 1995.pp. 29-36.

Rekimoto and Saitoh. "Augmented Surfaces: A Spatially Continuous Work Space for Hybrid Computing Environments." *CHI '99*, May 15-20, 1999. Pittsburgh, Pennsylvania. ©ACM 1999 0-201-48559-1/99/05. pp. 378-385.

Rekimoto, Jun. "Matrix: A Realtime Object Indentification and Registration Method for Augmented Reality." *Proc. of Asia Pacific Computer Human Interaction (APCHI '98)*, 1998. 6pp.

Rekimoto, Jun. "Multiple-Computer User Inerfaces: 'Beyond the Desktop' Direct Manipulation Environments." *ACI CHI2000 Video Proceedings*, 2000. 2pp.

Rekimoto, Jun. "Pick-and-Drop: A Direct Manipulation Technique for Multiple Computer Environments." *Proceedings of UIST'97*, 1997. pp 31-39.

Rekimoto, Jun. "SmartSkin: An Infrastructure for Freehand Manipulation on Interactive Surfaces." *CHI 2002*, Apr. 20-25, 2002, Minneapolis, Minnesota. ©2001 ACM 1-58113-453-3/02/0004. 8pp.

Rekimoto, Ullmer, and Oba. "DataTiles: A Modular Platform for Mixed Physical and Graphical Interactions." *SIGCHI+01*, Mar. 31-Apr. 4, 2001, Seattle, WA. ©2001 ACM 1-58113-327-8/01/0003. 8pp.

Reznik, Canny, and Alldrin. "Leaving on a Plane Jet." *2001 Int. Conf. on intell. Robots & Systems (IROS)*, Maui, Hawaii, Oct. 2001. 6pp.

Ringel, Gerh, Jin, and Winograd. "Barehands: Implement-Free Interaction with a Wall-Mounted Display." Short Talks. *CHI 2001* Mar. 31 - Apr. 5. pp. 367-368.

Rosenfeld, Zawadzki, Sudol, and Perlin. "Planar Manipulator Display." New York University mrl. NYU Media Research Lab. Available http://cat.nyu.edu/PMD. Printed May 16, 2004. 3pp.

Rovani, David (Posted by). "My Second Month with the Compaq Tablet." *Home>Reviews, TablePCHome.com- Table PC user community*. Posted Apr. 10, 2003. Available http://www.tablepchome.com/Messages.aspx?ThreadID=140. Printed Dec. 20, 2003. pp. 1-2 of 5.

Schmalstieg, Encarnação, and Szalavári. "Using Transparent Props for Interaction With The Virtual Table." Presented at *1999 ACM Symposium on Interactive 3D Graphics (I3DG '99)*. Apr. 26-28, 1999, Atlanta, GA. 7pp.

Scott, Grant, and Mandryk. "System Guidlines for Co-located Collaborative Work on a Tabletop Display." *Proceedings of ECSCW'03, European conference Computer-Supported Copperative Work 2003*, Helsinki, Finland, Sep. 14-18, 2003. 20pp.

Shen, Everitt, and Ryall. "UbiTable: Impromptu Face-to-Face Collaboration on Horizontal Interactive Surfaces." © Mitsubishi Electric Research Laboratories, Inc., 2003. Cambridge, Massachusetts. TR-2003-49. Sep. 2003. 10pp.

Shen, Lesh, and Vernier. "Personal Digital Historian: Story Sharing Around the Table." *Interactions*. Mar. + Apr. 2003. pp. 15-22.

Shen, Lesh, Bernier, Forlines, and Frost. "Sharing and Building Digital Group Histories." *CSCW'02*, Nov. 16-20, 2002, New Orleans, Louisiana. ©2002 ACM 1-58113-560-2/02/0011. 10pp.

Shen, Lesh, Moghaddam, Beardsley, and Bardsley. "Personal Digital Historian: User Interface Design." © Mitsubishi Electric Research Laboratories, Inc. 2001. Cambridge, Massachusetts, 5pp.

Shen, Vernier, Forline, and Ringel. "DiamondSpin: An Extensible Toolkit for Around-the-Table Interaction." *CHI 2004*, Apr. 24-29, 2004, Vienna, Austria. © ACM 1-58113-702-8/04/0004. 8pp.

SMART Technologies Inc. White Paper. "DViT Digital Vision Touch Technology." Feb. 2003. 10pp.

Smart Technologies, Inc. "Rear Projection SMART Board™ Interactive Whiteboard" "SMART Board Software". Available http://www.smarttech.com/Products/rearprojection/index.asp and http://www.smarttech.com/Products/sbsoftware/index.asp. Printed Dec. 16, 2003. 5pp. total.

Starner, Leibe, Singletary, Lyons, Gandy, and Pair. "Towards Augmented Reality Gaming." Available http://www.gvu.gatech.edu/ccg/publications/imagina2000/. Printed Dec. 30, 2003. 27pp.

Streitz, Geißler, Holmer, Konomi, Müller-Tomfelde, Reischl, Rexrogh, Seitz, and Steinmetz. "i-LAND: An interactive Landscape for Creativity and Innovation." *Proceedings of the ACM Conference on Human Factors in Computing Systems (CHI'99)*, Pittsburgh, Pennsylvania, May 15-20, 1999. ACM Press, New York, pp. 120-127.

Symanzik, Jürgen. "Three-Dimensional Statistical Graphics Based On Interactiviely Animated Anaglyphs." Published 1993, Available http://citeseer.mj.nec.com/95667.html. Printed Feb. 25, 2004. 7pp. total.

"The Tablet PC A detailed look at Microsoft's proposed Tablet PC." *Pen Computing Magazine: Tablet PC*. Available http://www.pencomputing.com/frames/textblock_tablet_pc.html. Printed Dec. 30, 2003. pp. 1.

Tandler, Prante, Müller-Tomfelde, Streitz, and Steinmetz. "ConnecTables: Dynamic Coupling of Displays for the Flexible Creation of Shared Workspaces." *Proceedings of the 14. Annual ACM Symposium on User Interfaces Software and Technoic (USIT'01)*, ACM Press (CHI Letters 3 (2)), 2001, pp. 11-20 (10pp).

Ullmer and Ishii. "The metaDESK: Models and Prototypes for Tangible User Interfaces." *Proceedings of UIST'97*, Oct. 14-17, 1997. © 1997 ACM-ACM 0-89791-881-9/97/10. 10pp.

Ullmer, Ishii, and Glas. "mediaBlocks: Physical Containers, Transports, and Controls for Online Media." *Computer Graphics Proceedings (SIGGRAPH'98)*, Jul. 19-24, 1998, © 1998 ACM. ACM-0-89791-999-8-9/98/007. 8pp.

Ullmer, Ishii, and Jacob. "Tangible query Interfaces: Physically Constrained Tokens for Manipulating Database Queries." *Proc. INTERACT 2003 Conference*, 2003. 11pp.

Underkoffler and Ishii. "Illuminatiing Light: An Optical Design Tool with a Luminous-Tangible Interface." *Proceedings of CHI '98*, Apr. 18-23, 1998, © 1998 ACM. pp. 1-8.

Underkoffler and Ishii, "Urp: A Luminous-Tangible Workbench for Urban Planning and Design." *Proceedings of CHI '99*. May 15-20, 1999. © 1998 ACM. pp. 21-8.

Underkoffler, Ullmer, and Ishii. "Emancipated Pixels: Real-World Graphics in the Luminous Room." *Proceedings of SIGGRAPH '99*, Aug. 8-13, 1999, © 1999 ACM. 8pp.

Vernier, Lesh, and Shen. "Visualization Techniques for Circular Tabletop Interfaces." Ti appear in *Advanced Visual Interfaces*, may 2002, Trento, Italy. © 2002 Mitsubishi Electric Research Laboratories, Inc. MERL-TR2002-01. Authored Mar. 2002. 10pp.

Viola and Joes. "Robust Real-time Object Detection." Cambridge Research Laboratory, Technical Report Series. Compaq. CRL 2001/01, Feb. 2001. 30pp.

"VIRTUALBOARD." Available http://visilab.unime.it/visilab/virtualboard.htm. Printed Dec. 16, 2003. 6pp.

Von Hardenberg and Bérard. Bare-Hand Human-Computer Interaction. *PUI 2001* Orlando, FL, ©2001 ACM 1-58113-448-7-11/14/01. 8pp.

Wellner, Pierre. "Interacting with Paper on the DigitalDesk." *Communications of the ACM*. Jul. 1993. EuroPARC tech report EPC-93-195. 17pp.

Whalen, Tara. "Playing well with Others: Applying Board Game Design to Tabletop Display Interfaces." *UIST 2003*. Vancouver, Nov. 2-5, 2003, 3pp.

Wu and Balakrishnan. "Multi-Finger and Whole Hand Gestural Interaction Techniques for Multi-User Tabletop Displays." *UIST '03*, Vancouver, B.C., Canada. ©2003 ACM 1-58113-636-6/03-0010. pp. 193-202.

\* cited by examiner

DISPOSING IDENTIFYING CODES ON A USER'S HAND TO PROVIDE INPUT TO AN INTERACTIVE DISPLAY APPLICATION

FIELD OF THE INVENTION

The present invention generally pertains to a computing system having an interactive display surface operable to detect physical objects placed adjacent thereto, and, more specifically, to detect optical codes positioned by a user adjacent to the interactive display surface, to provide input to change one or more attributes of an application that is executing on the computing system.

BACKGROUND OF THE INVENTION

Personal computers (PCs) have become increasingly more powerful in many different respects. One example of the increased power of computers is in their tremendously improved graphics capabilities. While early PCs were limited to four colors and pixilated low resolution displays, contemporary computers provide colorful, high-resolution graphics that are more than suitable for viewing digital photographs or watching movies as well as enabling display of fast moving virtual images in games and other applications.

The improved power of computers also has resulted in today's computers being far more user friendly than their predecessors. Not long ago, personal computers were command-driven, requiring users to remember and enter combinations of keystrokes to direct a computer to perform even simple commands. Today, users engage computers using pointing devices, handwriting recognition, speech recognition, and other simple, intuitive techniques. Personal computers appear on nearly every desk in the workplace. Many households now have multiple computers, and even in-home local area networks.

As computers become more powerful and more ubiquitous throughout our environment, the desire to make computers and their interfaces even more user friendly continues to promote development in this area. For example, the MIT Media Lab, as reported by Brygg Ullmer and Hiroshi Ishii in "The metaDESK: Models and Prototypes for Tangible User Interfaces," *Proceedings of UIST* 10/1997:14-17," has developed another form of "keyboardless" human-machine interface. The metaDESK includes a generally planar graphical surface that not only displays computing system text and graphic output, but also receives user input by responding to an object placed against the graphical surface. The combined object responsive and display capability of the graphical surface of the metaDESK is facilitated using IR (IR) light, an IR camera, a video camera, a video projector, and mirrors disposed beneath the surface of the metaDESK. The mirrors reflect the graphical image projected by the projector onto the underside of the graphical display surface to provide images that are visible to a user from above the graphical display surface. The IR camera can detect IR light reflected from the undersurface of an object placed on the graphical surface.

Others have been developing similar keyboardless interfaces. For example, papers published by Jun Rekimoto of the Sony Computer Science Laboratory, Inc., and associates describe a "HoloWall" and a "HoloTable" that display images on a surface and use IR light to detect objects positioned adjacent to the surface.

By detecting a specially formed object or IR-reflected light from an object disposed on a graphical display surface, the metaDESK can respond to the contemporaneous placement and movement of the object on the display surface to carryout a predefined function, such as displaying and moving a map of the MIT campus. Such systems are generally limited to responding to a specific object in a predefined manner.

It would be desirable to expand upon the functionality of an interactive display system, to enable a user to interact with a display surface more intuitively, naturally, and completely. Ideally, a user should be able to engage a computer system, such as by responding to prompts, issuing commands, or changing attributes, without having to use a keyboard or make use of any specific physical objects. To make the use of a personal computer even more convenient, it would clearly be desirable to interact with images or other graphical information presented by a computing system on a display screen by using ordinary objects or even one's own hands and fingers.

SUMMARY OF THE INVENTION

One of the advantages of the present invention is that it provides a convenient, natural, and intuitive manner for a user to provide input to a computer system having an interactive display surface. In conventional systems, a user responds to images or other attributes of applications presented on a display by engaging a keyboard, a pointing device, or another input device that is separate and removed from the display. Using embodiments of the present invention, a user can use one or both hands and/or one or more fingers to provide input at any convenient location on the interactive display surface. One or more of the user's fingers, or other parts of the user's hand, has affixed thereto an identifying code that can be read by the interactive display surface when the part of the user's hand equipped with the identifying code is positioned adjacent to the interactive display surface. (As used herein and in the claims that follow, the term "adjacent to" will be understood to encompass the condition where the identifying code is actually in contact with the interactive display surface, as well as the condition where the identifying code is sufficiently close to the interactive display surface to enable the identifying code to be accurately detected by the computer system that is coupled to the interactive display surface.) Unlike touch-sensitive screens or similar input devices that allow a user to provide input by engaging designated areas of the display, the present invention enables a user to engage the interactive display surface at any convenient point with an identifying code that is not on an object simply grasped by the user, but is provided on an article actually worn by or affixed to the user's hand. Similarly, a user can move his or her hands to a location that is more comfortable or that does not occlude images being displayed on the interactive surface and continue to provide input. By contrast, on conventional touch-sensitive screens, user input is restricted to designated areas on the screen associated with permitted user responses. If a user's hands or fingers are equipped with multiple identifying codes disposed on multiple different parts of a user's hand, a user can quickly provide multiple different inputs to the system as though the user had access to a moving virtual keyboard or keypad.

More particularly, input is provided to a computer system having an interactive display surface. An identifying code configured to be detectable by the interactive display surface when the identifying code is positioned adjacent to the interactive display surface is determined. In a preferred form of the present invention that was initially developed, the identifying code comprises an optical code that is detected based upon light reflected from the optical code. However, it is contemplated other forms of identifying code and corresponding sensors for detecting the identifying code might also be used, including magnetic sensors for detecting a magnetic identifying code, a capacitive sensor for detecting a capacitive code, or an electromagnetic or radio frequency sensor for detecting an electromagnetic or radio frequency code. The identifying code is affixed to an article configured to be removably affixed (or placed on) to at least a portion of a user's hand. When the portion of the user's hand is moved to a position adjacent to the interactive display surface, the interactive display surface can detect the identifying code and invoke a responsive function associated with the identifying code. Thus, a user can provide input to the interactive display surface through movements of the user's hand, which moves the identifying code adjacent to the interactive display surface. A plurality of identifying codes may be disposed on the user's hand to allow a user to invoke a plurality of responsive functions based on movements of the user's hand.

In accordance with one embodiment of the present invention, the identifying code includes at least one of a bar code, a matrix code, a radial code, a gray scale code, an identifiable color, and an arbitrary shape code, and a light sensor is used to detect the identifying code. In a preferred embodiment, the identifying code is configured to be detectable by infrared light, by transmitting infrared light through the interactive display surface toward a face of the interactive display surface, so that when the identifying code is positioned adjacent to an opposite side of the interactive display surface, it is detected by sensing infrared light reflected from the identifying code. The identifying code is associated with a response of the application that is invoked upon detecting the identifying code positioned adjacent to the interactive display surface.

According to one aspect of the present invention, the article includes a deformable digit cap configured to be worn on an end of a user's digit. Alternatively, the article includes a layer configured to be removably adhered to a user's digit at a first side of the layer and further configured so that the identifying code is detectable at an opposite side of the layer. Also, the article may include a hand covering configured to cover at least a portion of a palm of a user's hand, such as a glove, mitten, mitt, or an attachable panel. The hand covering may include a plurality of distinct identifying codes at a plurality of locations on the hand covering. Each of the plurality of distinct identifying codes may be associated with a distinct response the application is configured to invoke upon detecting each of the plurality of distinct identifying codes positioned adjacent to the interactive display surface.

The identifying code may be affixed to the article by one of forming, molding, printing, and depositing the identifying code onto the article. Alternatively, the identifying code is affixed to the article by forming the identifying code on an intermediate medium and attaching the intermediate medium to the article.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

Figure 12:
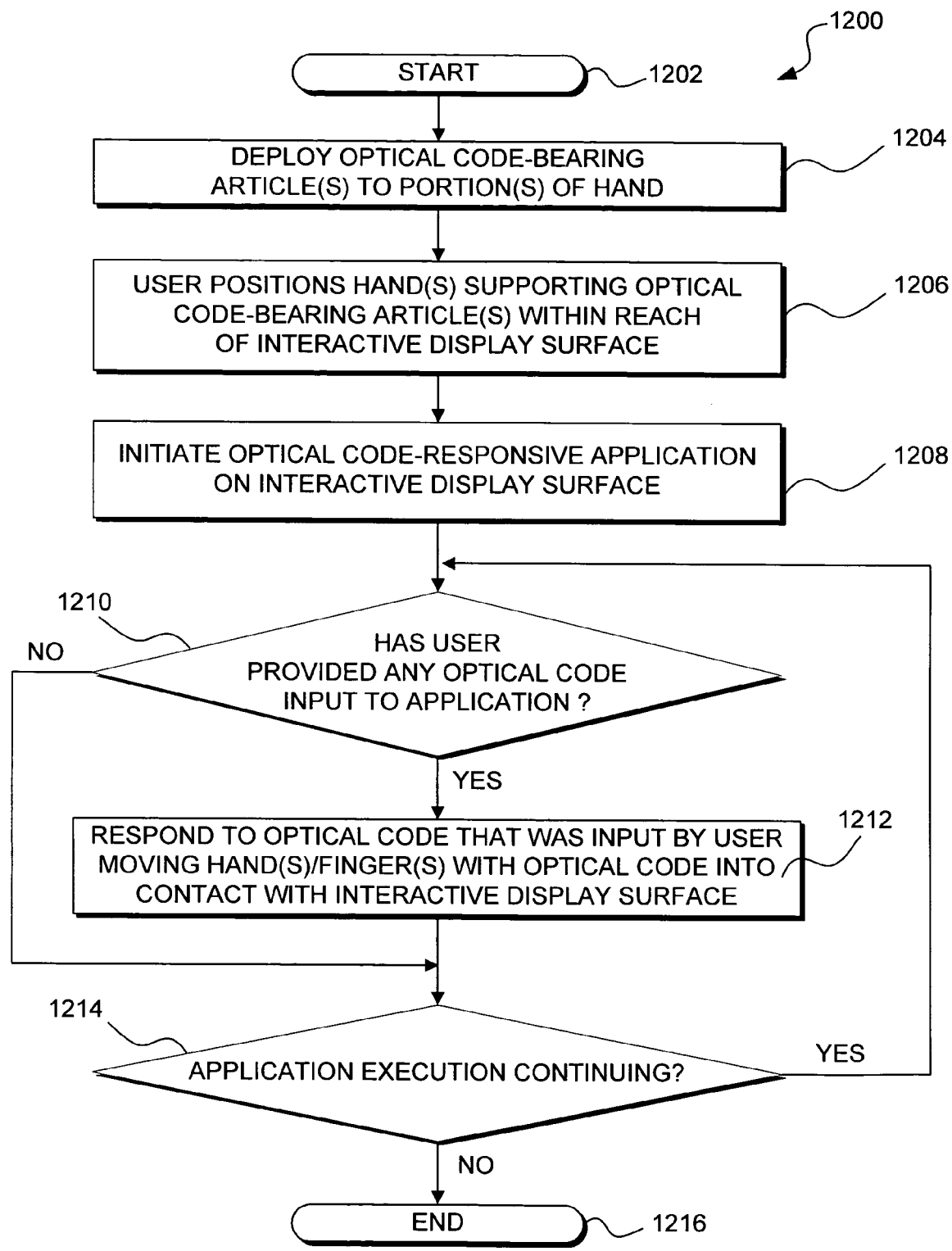
Figure 13:
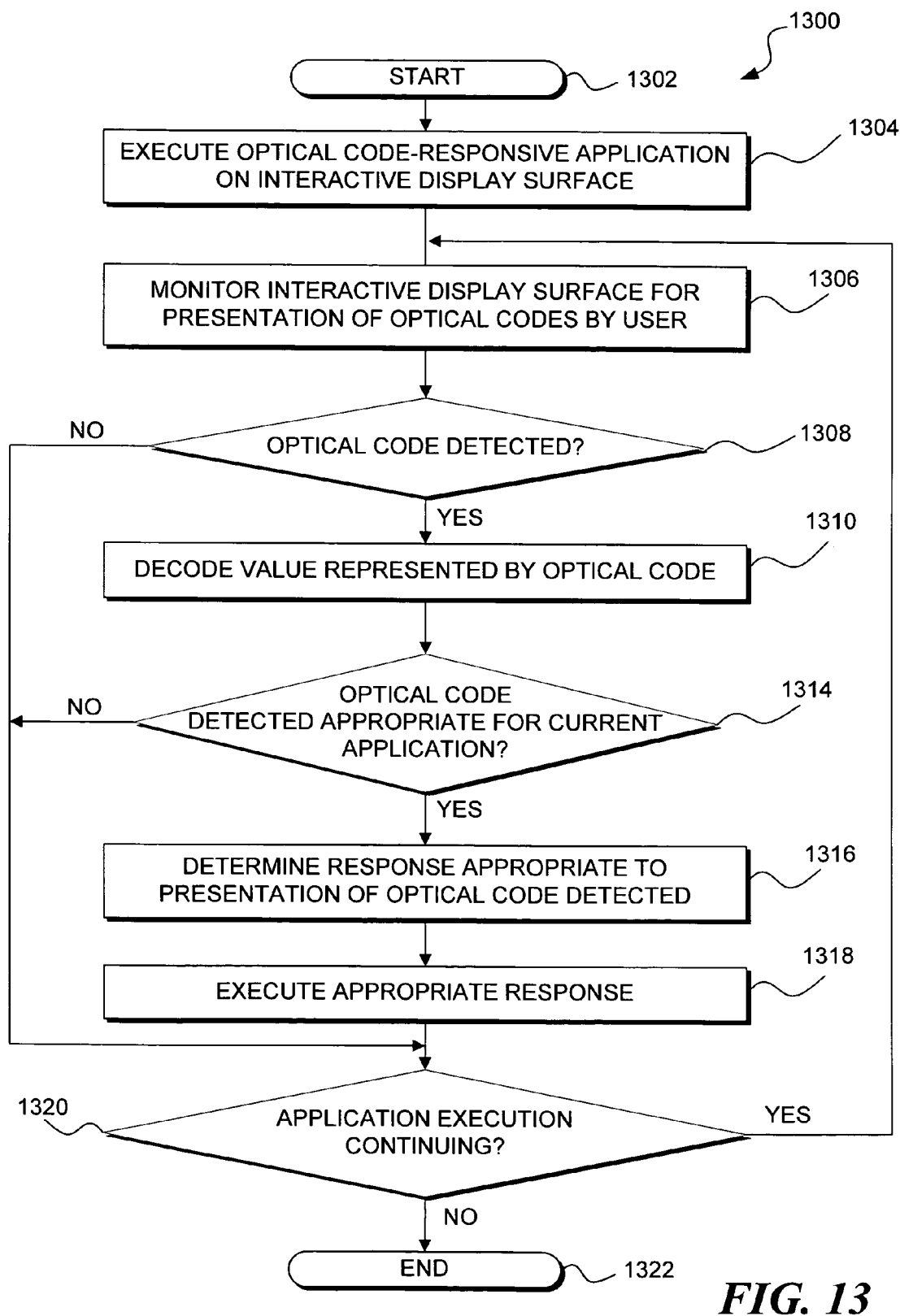

FIG. 12 is a flow diagram illustrating the logical steps by which a user can manipulate optical codes associated with portions of the user's hand to provide input to an application executing on an interactive display surface; and FIG. 13 is a flow diagram illustrating the logical steps by which an application executing on an interactive display surface detects and responds to optical codes associated with portions of a user's hand.

DESCRIPTION OF THE PREFERRED EMBODIMENT

Exemplary Computing System for Implementing Present Invention

Figure 1:
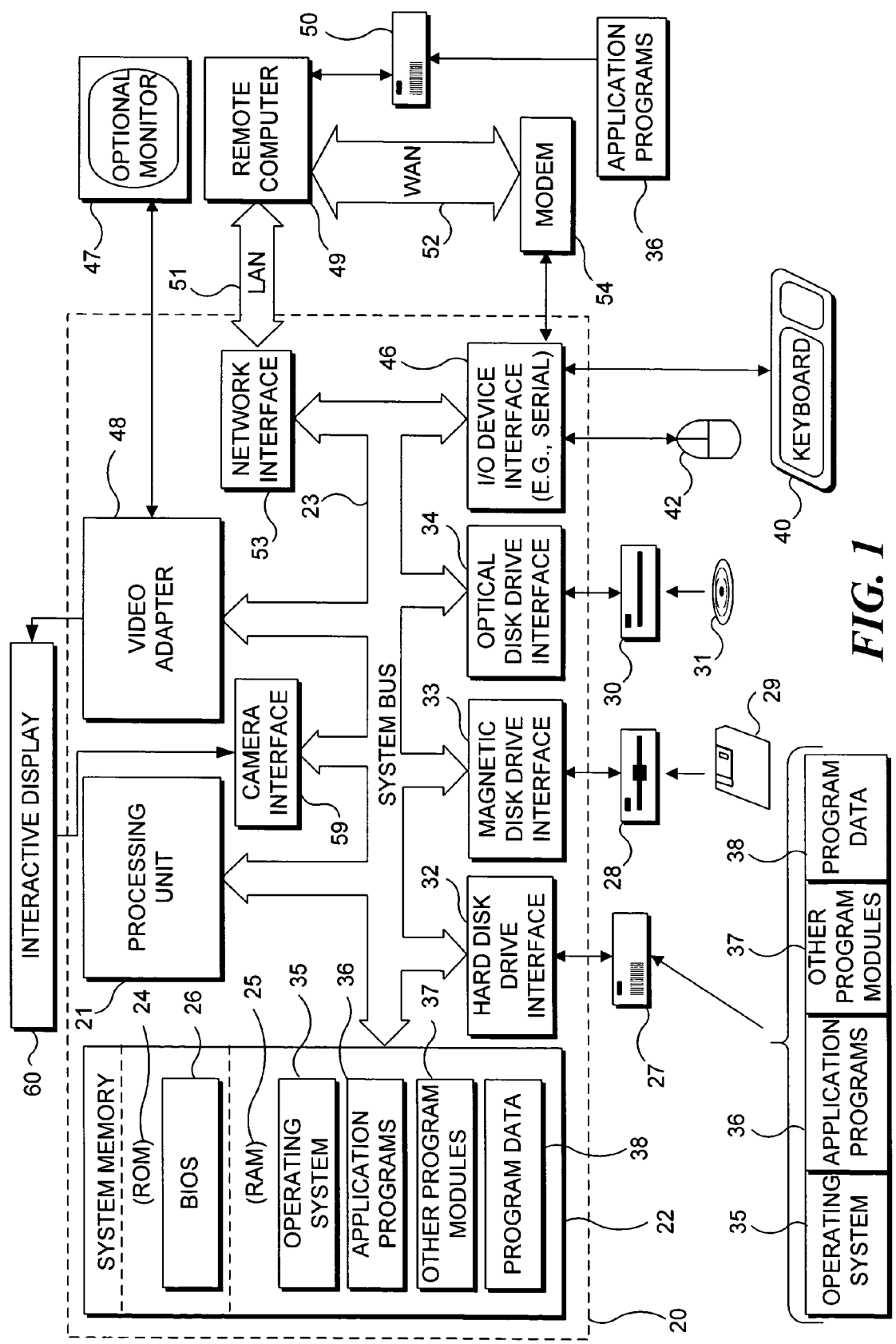
FIG. 1 is a functional block diagram of a generally conventional computing device or personal computer (PC) that is suitable for use with an interactive display surface in practicing the present invention.

With reference to FIG. 1, an exemplary system suitable for implementing various portions of the present invention is shown. The system includes a general purpose computing device in the form of a conventional PC 20, provided with a processing unit 21, a system memory 22, and a system bus 23. The system bus couples various system components including the system memory to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the PC 20, such as during start up, is stored in ROM 24. PC 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a compact disk-read only memory (CD-ROM) or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although the exemplary environment described herein employs a hard disk, removable magnetic disk 29, and removable optical disk 31, it will be appreciated by those skilled in the art that other types of computer readable media, which can store data and machine instructions that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information in PC 20 and provide control input through input devices, such as a keyboard 40 and a pointing device 42. Pointing device 42 may include a mouse, stylus, wireless remote control, or other pointer, but in connection with the present invention, such conventional pointing devices may be omitted, since the user can employ the interactive display for input and control. As used hereinafter, the term "mouse" is intended to encompass virtually any pointing device that is useful for controlling the position of a cursor on the screen. Other input devices (not shown) may include a microphone, joystick, haptic joystick, yoke, foot pedals, game pad, satellite dish, scanner, or the like. These and other input/output (I/O) devices are often connected to processing unit 21 through an I/O interface 46 that is coupled to the system bus 23. The term I/O interface is intended to encompass each interface specifically used for a serial port, a parallel port, a game port, a keyboard port, and/or a universal serial bus (USB). System bus 23 is also connected to a camera interface 59, which is coupled to an interactive display 60 to receive signals form a digital video camera that is included therein, as discussed below. The digital video camera may be instead coupled to an appropriate serial I/O port, such as to a USB version 2.0 port. Optionally, a monitor 47 can be connected to system bus 23 via an appropriate interface, such as a video adapter 48; however, the interactive display table of the present invention can provide a much richer display and interact with the user for input of information and control of software applications and is therefore preferably coupled to the video adaptor. It will be appreciated that PCs are often coupled to other peripheral output devices (not shown), such as speakers (through a sound card or other audio interface—not shown) and printers.

The present invention may be practiced on a single machine, although PC 20 can also operate in a networked environment using logical connections to one or more remote computers, such as a remote computer 49. Remote computer 49 may be another PC, a server (which is typically generally configured much like PC 20), a router, a network PC, a peer device, or a satellite or other common network node, and typically includes many or all of the elements described above in connection with PC 20, although only an external memory storage device 50 has been illustrated in FIG. 1. The logical connections depicted in FIG. 1 include a local area network (LAN) 51 and a wide area network (WAN) 52. Such networking environments are common in offices, enterprise wide computer networks, intranets, and the Internet.

When used in a LAN networking environment, PC 20 is connected to LAN 51 through a network interface or adapter 53. When used in a WAN networking environment, PC 20 typically includes a modem 54, or other means such as a cable modem, Digital Subscriber Line (DSL) interface, or an Integrated Service Digital Network (ISDN) interface for establishing communications over WAN 52, such as the Internet. Modem 54, which may be internal or external, is connected to the system bus 23 or coupled to the bus via I/O device interface 46, i.e., through a serial port. In a networked environment, program modules, or portions thereof, used by PC 20 may be stored in the remote memory storage device. It will be appreciated that the network connections shown are exemplary and other means of establishing a communications link between the computers may be used, such as wireless communication and wide band network links.

Exemplary Interactive Surface

Figure 2:
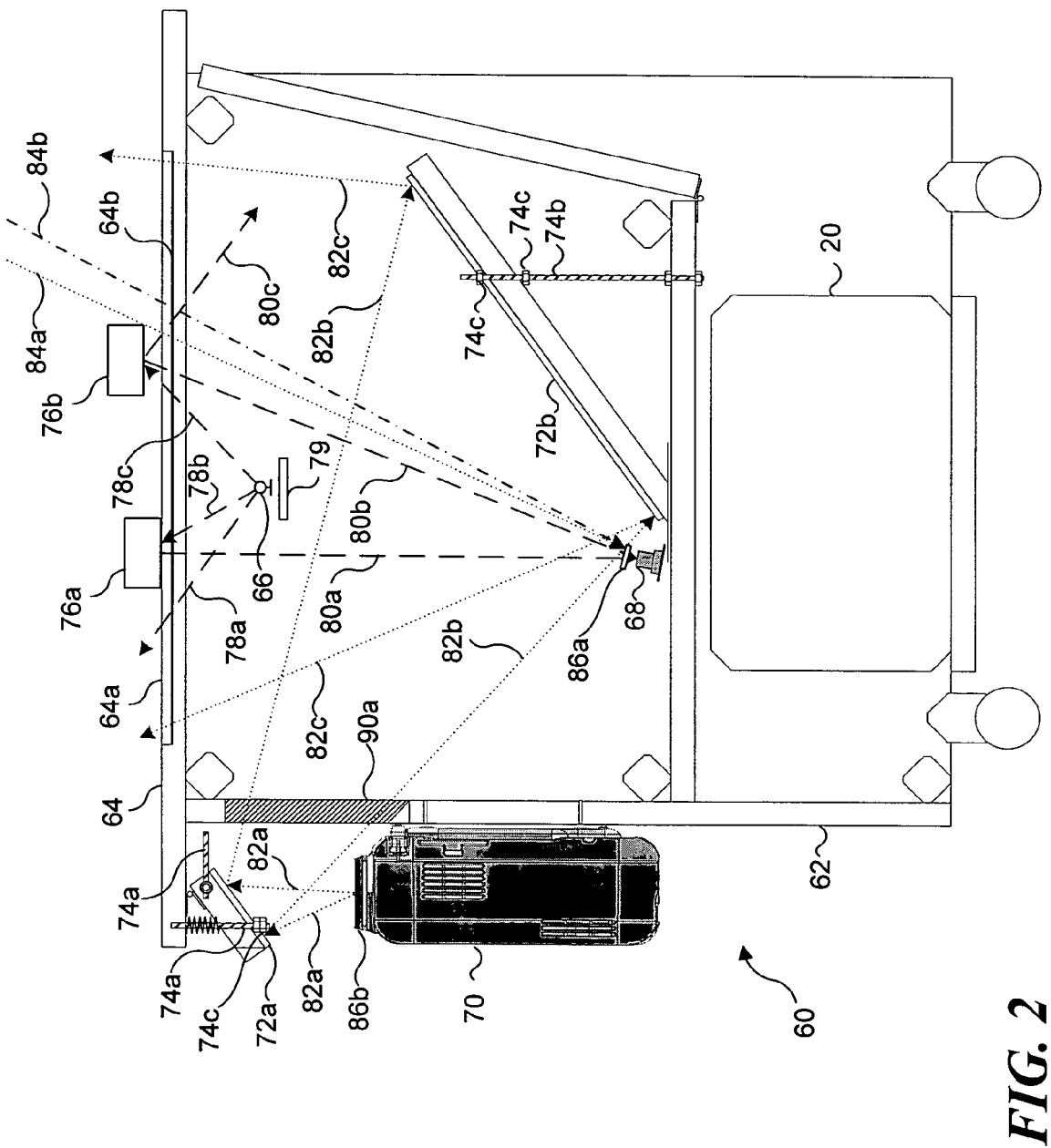
FIG. 2 is a cross-sectional view illustrating internal components of an interactive display surface in the form of an interactive table that includes an integral PC.

In FIG. 2, an exemplary interactive display table 60 is shown that includes PC 20 within a frame 62 and which serves as both an optical input and video display device for the computer. In this cut-away Figure of the interactive display table, rays of light used for displaying text and graphic images are generally illustrated using dotted lines, while rays of infrared (IR) light used for sensing objects on or just above a display surface 64a of the interactive display table are illustrated using dash lines. Display surface 64a is set within an upper surface 64 of the interactive display table. The perimeter of the table surface is useful for supporting a user's arms or other objects, including objects that may be used to interact with the graphic images or virtual environment being displayed on display surface 64a.

IR light sources 66 preferably comprise a plurality of IR light emitting diodes (LEDs) and are mounted on the interior side of frame 62. The IR light that is produced by IR light sources 66 is directed upwardly toward the underside of display surface 64a, as indicated by dash lines 78a, 78b, and 78c. The IR light from IR light sources 66 is reflected from any objects that are atop or proximate to the display surface after passing through a translucent layer 64b of the table, comprising a sheet of vellum or other suitable translucent material with light diffusing properties. Although only one IR source 66 is shown, it will be appreciated that a plurality of such IR sources may be mounted at spaced-apart locations around the interior sides of frame 62 to prove an even illumination of display surface 64a. The infrared light produced by the IR sources may:

exit through the table surface without illuminating any objects, as indicated by dash line 78a;
 illuminate objects on the table surface, as indicated by dash line 78b; or
 illuminate objects a short distance above the table surface but not touching the table surface, as indicated by dash line 78c.

Objects above display surface 64a include a "touch" object 76a that rests atop the display surface and a "hover" object 76b that is close to but not in actual contact with the display surface. As a result of using translucent layer 64b under the display surface to diffuse the IR light passing through the display surface, as an object approaches the top of display surface 64a, the amount of IR light that is reflected by the object increases to a maximum level that is achieved when the object is actually in contact with the display surface.

A digital video camera 68 is mounted to frame 62 below display surface 64a in a position appropriate to receive IR light that is reflected from any touch object or hover object positioned above display surface 64a. Digital video camera 68 is equipped with an IR pass filter 86a that transmits only IR light and blocks ambient visible light traveling through display surface 64a along dotted line 84a. A baffle 79 is disposed between IR source 66 and the digital video camera to prevent IR light that is directly emitted from the IR source from entering the digital video camera, since it is preferable that this digital video camera should produce an output signal that is only responsive to the IR light reflected from objects that are a short distance above or in contact with display surface 64a and corresponds to an image of IR light reflected from objects on or above the display surface. It will be apparent that digital video camera 68 will also respond to any IR light included in the ambient light that passes through display surface 64a from above and into the interior of the interactive display (e.g., ambient IR light that also travels along the path indicated by dotted line 84a).

IR light reflected from objects on or above the table surface may be:
- reflected back through translucent layer 64b, through IR pass filter 86a and into the lens of digital video camera 68, as indicated by dash lines 80a and 80b; or
- reflected or absorbed by other interior surfaces within the interactive display without entering the lens of digital video camera 68, as indicated by dash line 80c.

Translucent layer 64b diffuses both incident and reflected IR light. Thus, as explained above, "hover" objects that are closer to display surface 64a will reflect more IR light back to digital video camera 68 than objects of the same reflectivity that are farther away from the display surface. Digital video camera 68 senses the IR light reflected from "touch" and "hover" objects within its imaging field and produces a digital signal corresponding to images of the reflected IR light that is input to PC 20 for processing to determine a location of each such object, and optionally, the size, orientation, and shape of the object. It should be noted that a portion of an object (such as a user's forearm) may be above the table while another portion (such as the user's digit) is in contact with the display surface. In addition, an object may include an IR light reflective pattern or coded identifier (e.g., a bar code) on its bottom surface that is specific to that object or to a class of related objects of which that object is a member. Accordingly, the imaging signal from digital video camera 68 can also be used for detecting each such specific object, as well as determining its orientation, based on the IR light reflected from its reflective pattern, in accord with the present invention. The logical steps implemented to carry out this function are explained below.

Figure 3:
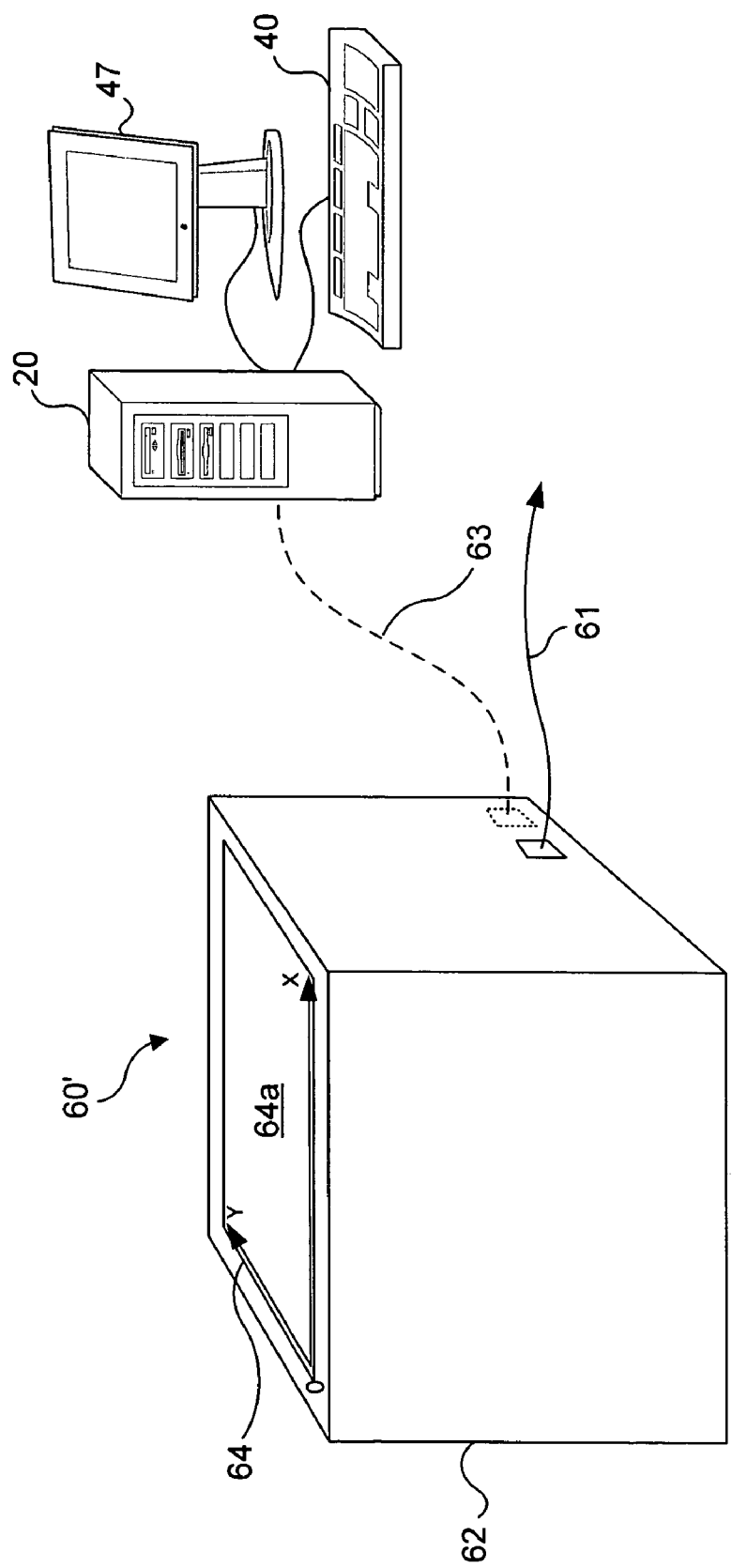
FIG. 3 is an isometric view of an embodiment in which the interactive table is connected to an external PC.

PC 20 may be integral to interactive display table 60 as shown in FIG. 2, or alternatively, may instead be external to the interactive display table, as shown in the embodiment of FIG. 3. In FIG. 3, an interactive display table 60' is connected through a data cable 63 to an external PC 20 (which includes optional monitor 47, as mentioned above). As also shown in this Figure, a set of orthogonal X and Y axes are associated with display surface 64a, as well as an origin indicated by "0." While not specifically shown, it will be appreciated that a plurality of coordinate locations along each orthogonal axis can be employed to indicate any location on display surface 64a.

If the interactive display table is connected to an external PC 20 (as in FIG. 3) or to some other type of external computing device, such as a set top box, video game, laptop computer, or media computer (none shown), then the interactive display table comprises an input/output device. Power for the interactive display table is provided through a power lead 61, which is coupled to a conventional alternating current (AC) line source (not shown). Data cable 63, which connects to interactive display table 60', can be coupled to a USB 2.0 port, an Institute of Electrical and Electronics Engineers (IEEE) 1394 (or Firewire) port, or an Ethernet port on PC 20.

It is also contemplated that as the speed of wireless connections continues to improve, the interactive display table might also be connected to a computing device such as PC 20 via such a high speed wireless connection, or via some other appropriate wired or wireless data communication link. Whether included internally as an integral part of the interactive display, or externally, PC 20 executes algorithms for processing the digital images from digital video camera 68 and executes software applications that are designed to use the more intuitive user interface functionality of interactive display table 60 to good advantage, as well as executing other software applications that are not specifically designed to make use of such functionality, but can still make good use of the input and output capability of the interactive display table. As yet a further alternative, the interactive display can be coupled to an external computing device, but include an internal computing device for doing image processing and other tasks that would then not be done by the external PC.

An important and powerful feature of the interactive display table (i.e., of either embodiments discussed above) is its ability to display graphic images or a virtual environment for games or other software applications and to enable an interaction between the graphic image or virtual environment visible on display surface 64a and objects that are resting atop the display surface, such as an object 76a, or are hovering just above it, such as an object 76b. It is the ability of the interactive display table to visually detect such objects, as well as the user's digit or other object being moved by the user that greatly facilities this rich interaction.

Again referring to FIG. 2, interactive display table 60 includes a video projector 70 that is used to display graphic images, a virtual environment, or text information on display surface 64a. The video projector is preferably of a liquid crystal display (LCD) or digital light processor (DLP) type, or a liquid crystal on silicon (LCoS) display type, with a resolution of at least 640×480 pixels. An IR cut filter 86b is mounted in front of the projector lens of video projector 70 to prevent IR light emitted by the video projector from entering the interior of the interactive display table where the IR light might interfere with the IR light reflected from object(s) on or above display surface 64a. A first mirror assembly 72a directs projected light traveling from the projector lens along dotted path 82a through a transparent opening 90a in frame 62, so that the projected light is incident on a second mirror assembly 72b. Second mirror assembly 72b reflects the projected light onto translucent layer 64b, which is at the focal point of the projector lens, so that the projected image is visible and in focus on display surface 64a for viewing.

Alignment devices 74a and 74b are provided and include threaded rods and rotatable adjustment nuts 74c for adjusting the angles of the first and second mirror assemblies to ensure that the image projected onto the display surface is aligned with the display surface. In addition to directing the projected image in a desired direction, the use of these two mirror assemblies provides a longer path between projector 70 and translucent layer 64b, and more importantly, helps in achieving a desired size and shape of the interactive display table, so that the interactive display table is not too large and is sized and shaped so as to enable the user to sit comfortably next to it.

The foregoing and following discussions describe an interactive display device in the form of interactive display table 60 and 60'. Nevertheless, it is understood that the interactive display surface need not be in the form of a generally horizontal table top. The principles described in this description of the invention suitably also include and apply to display surfaces of different shapes and curvatures and that are mounted in orientations other than horizontal. Thus, although the following description refers to placing physical objects "on" the interactive display surface, physical objects may be placed adjacent to the interactive display surface by placing the physical objects in contact with the display surface, or otherwise adjacent the display surface.

Providing Compound Input to the Interactive Display Surface

Figure 4A:
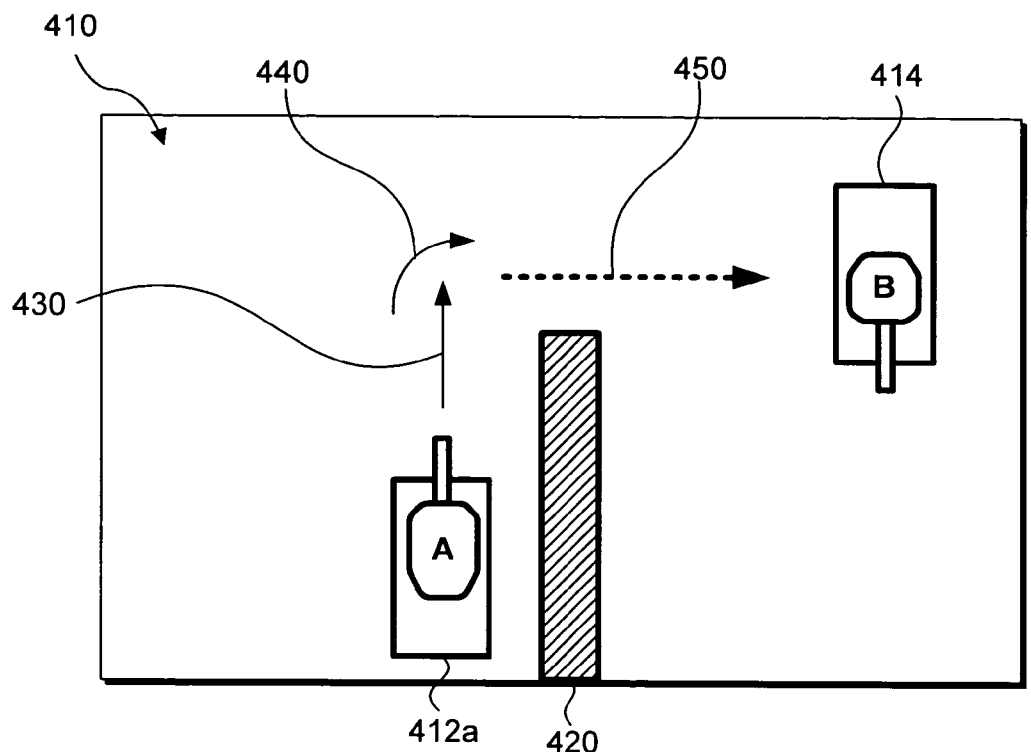
FIGS. 4A-4C illustrate an application executing on an interactive display surface and a desired manner of providing input to the application.
Figure 4B:
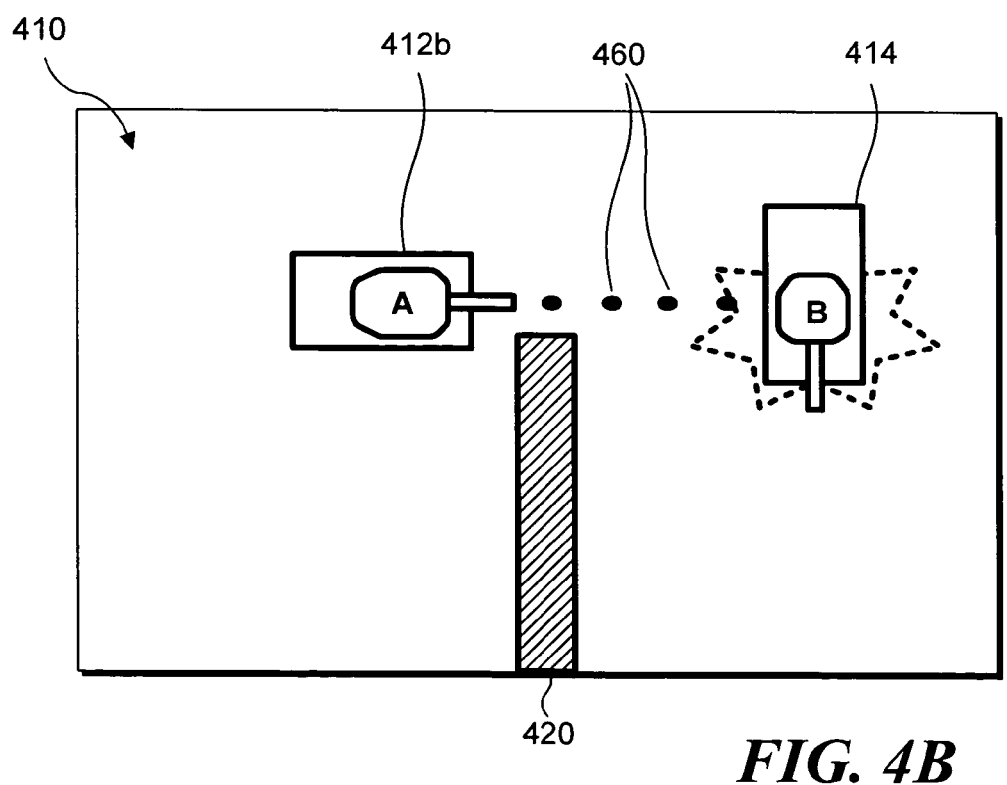

In FIGS. 4A-4B, the execution of an exemplary game program 410 on the interactive display surface is shown. In game program 410, a User A and a User B battle each other with virtual tanks 412a and 414, respectively. To score points and eventually win the game, users need to maneuver virtual tanks 412a and 414 around obstacles such as a wall 420. For example, assuming User B's tank 414 remains stationary, to attack, User A's tank 412a must move forward in the direction of an arrow 430 and turn in direction of an arrow 440 to permit a line of sight in the direction of an arrow 450, in order to fire at User B's tank 414. If User A successfully maneuvers tank 412a into the position shown in FIG. 4B, tank 412b can fire shells 460 or other weaponry upon User B's tank 414 and score points.

Those familiar with such games will recognize that directing virtual vehicles such as tank 412a to move in the direction of arrows 430 and 440 and fire weaponry along line 450 can be performed in a number of ways. For example, as is sometimes done in arcade versions of tank combat games, joystick handles can be provided for each track of the tank, such that pushing both handles forward or backward causes a virtual tank to move forward or backward, respectively, if no obstacles block the tank's path. Moving just one handle forward results in the tank turning in a direction toward the other handle/track, while moving just one handle backward results in the tank turning in the direction of the handle/track that was moved. Various combinations of movement of the two joystick handles result in turns of varying sharpness and direction. One or both of the handles also typically include a firing button for firing weaponry at a target.

Modeling commands like those of a dual joystick control on a keyboard or keypad might be accomplished through the use of five keys: a pair each to represent forward and backward movement of each track, and a fifth key for firing weaponry. More keys would be needed if, for example, the tank is to be made to move at variable speeds or to brake, or if the turret is to be rotated independently of the tank chassis, or if weapons are to be changed, etc.

Such a game application can be executed on interactive display surface 64a (FIG. 2) in a more intuitive manner than using keys on a keyboard. The interactive display surface, as previously described in connection with FIG. 2, both presents images and receives input by optically detecting objects adjacent to the interactive display surface. Projector 70 projects images that are viewable on interactive display surface 64a, and a camera 68 detects IR light produced by IR light sources 66 that is reflected back by physical objects 76a disposed adjacent interactive display surface 64a and by physical objects 76b hovering just above the interactive display surface. One of the advantages of interactive display surface 64a is that a user can provide input directly to an application that is being executed by PC 20, which is coupled to the interactive display surface, and thus, interact directly with the virtual environment projected on the interactive display surface. In other words, a user can engage the application presented on interactive display surface 64a without having to use a separate keypad, keyboard, or other input device and can actually "get in the game."

Figure 4C:
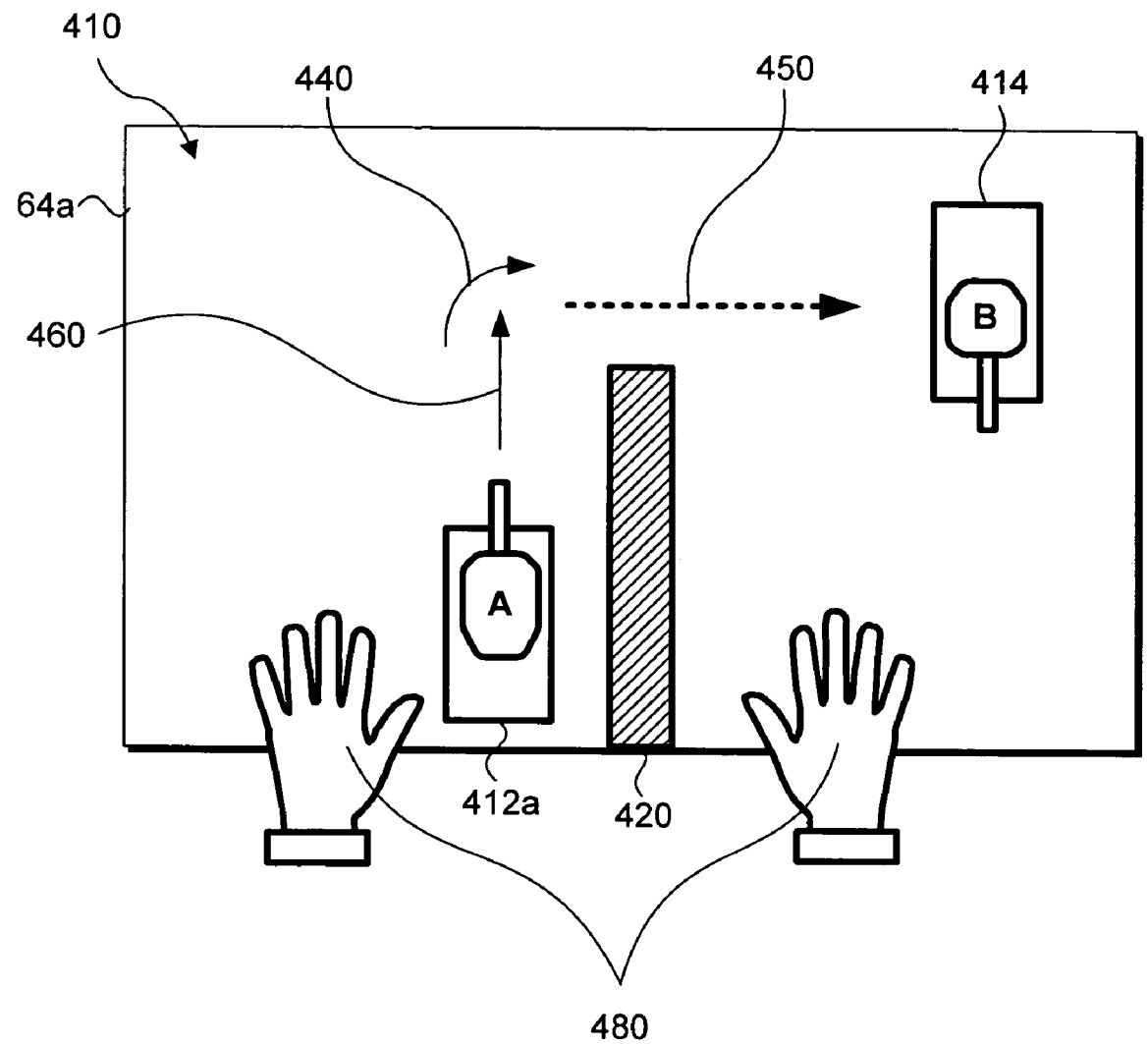

In FIG. 4C, game application 410 of FIGS. 4A and 4B is again shown executing on interactive display surface 64a. When executing the game application on interactive display surface 64a, the user desirably engages the application with the most natural input device available—user's hands 480. One method that could be used to engage interactive display surface 64a would be to project a virtual keypad on interactive display surface 64a; however, a virtual keypad might occlude virtual images projected thereon and disrupt enjoyment of the game. Although the virtual keypad could be moved, the user might then have to redirect attention from the game action to identify the new position of the virtual keypad and relocate the user's hands accordingly. Also, without the tactile response of a real keypad, it may be difficult for a user to properly interact with the virtual keypad without being distracted from the game action.

A better solution that might employ the vision sensing capability of the interactive display table would be to associate different commands with different digits of each users' hands. In this manner, each user might signal an action, such as left track forward or fire weapons, by appropriately positioning the digit to which the command is assigned adjacent to interactive display surface 64a. However, to implement this approach correctly, IR video camera 68 (FIG. 2) will need to have sufficient resolution and a sufficient frame rate to identify each of the user's respective digits, for example, by capturing the whorls, right loops, left loops, arches, tented arches, and other ridge patterns corresponding to the fingerprint of each digit. Capturing this level of detail in real time may be possible, but would require a significant processing overhead, since the display surface might need to identify and differentiate between fingerprints presented by each of the individual digits of each user, as well as distinguish between the players participating. Thus, to facilitate the game action, interactive display surface 64a would have to be associated with a computer system having sufficient processing speed to accurately process the image data sufficiently fast to keep pace with the game action. Meeting such demands with an interactive display surface may not be practical or cost-effective. Instead, the present invention uses a slightly different approach to solve this exemplary problem, as explained below.

Disposing Optical Codes on User's Hands to Provide Input

Figure 5A:
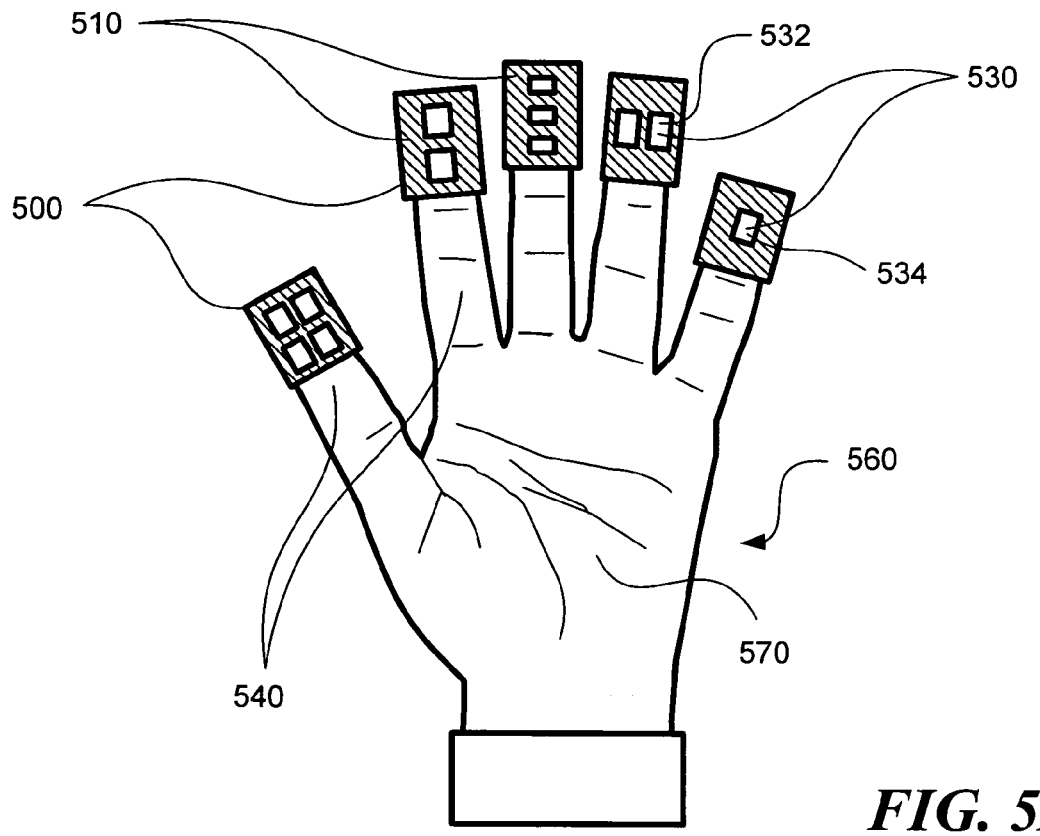
FIGS. 5A-5B illustrate one embodiment of the present invention in which a user's hand is equipped with a plurality of encoded digit caps configured to provide input to an application executing the interactive display surface.

FIG. 5A illustrates an embodiment of the invention using a plurality of digit caps 500 disposed on digits 540 of a user's hand 560. In this embodiment, digit caps 500 are fabricated of an elastomeric material, so that the digit caps can be fitted to digits of varying sizes. Undersides 510 of each of digit caps 500 corresponds to a palm side 570 of user's hand 560 and each includes an optical code 530 (the optical code provided on each digit cap is different than that on all of the other digit caps). As noted above, instead of using optical codes, other types of identifying codes might be used, including, for example, magnetic, capacitive, electromagnetic, radio frequency, etc, so long an appropriate sensor to detect the identifying codes used is provided with the interactive display surface.

In a preferred embodiment initially developed, the optical codes are detectable and recognizable by the interactive display surface to enable a user wearing digit caps 500 to interact with an application executing on the interactive display surface, by selectively placing a user's digit with the digit cap selected to perform a specific function, on the interactive display surface. The interactive display surface detects the optical codes 530 on undersides 510 of digit caps 500 when the user moves any of digits 540 to cause the optical code(s)

530 affixed to the digit(s) to be positioned adjacent to the interactive display surface. Upon detecting any of optical codes 530, the interactive display surface and its associated computing executes a response associated with the optical code(s) 530 detected, as appropriate to the application.

As described above in connection with FIG. 4C, one way to enable a user to interact with an interactive display surface would require that the interactive display surface sense, distinguish, and react to each user's fingerprints. As also described, however, the imaging resolution and processing involved may be impractical or prohibitive. On the other hand, disposing optical codes 530 on each of the user's digits 540 presents a practical way for the interactive display surface to detect and identify the user's digits without the problems associated with detecting and identifying specific fingerprints. As shown in the examples of FIG. 5A, optical codes 532 and 534 may be larger and much more easily identifiable than fingerprint patterns. Although optical codes 530 may be designed to be detected by IR light and need not be detectable to the human eye, optical codes 530 are illustrated in FIG. 5A as being visible to demonstrate this point. If simply glancing at the digits of a human hand, it is not possible to readily and reliably identify fingerprint patterns or rapidly distinguish one fingerprint pattern on one digit from that on another. In contrast, as will be apparent from viewing FIG. 5A, optical code 532 can readily be differentiated from optical code 534. Accordingly, the interactive surface can readily identify and respond to the various optical codes 530, even if presented in a sufficiently rapid manner to enable a user to exercise control of a fast moving game application. This form of control is relatively intuitive, because it is achieved by simply moving digits 540.

It will be appreciated that, although in FIG. 5A, each digit 540 bears a digit cap 500, the present invention does not require that each digit 540 of user's hand 560 have a digit cap 500 affixed thereto. Some applications might involve only two or three functions, and in this case, a user might only affix digit caps 500 on two or three digits 540. Alternatively, in an application involving use of fewer than ten digit caps 500, a user might choose how to apportion the digit caps between the digits of the user's hands. Further, if more than one user engages the application executing on the interactive display surface, each such user can use digit caps 500, but be provided with different optical codes so that control input by different users will be recognized. The number of different optical codes 530 of the simple form that is easily recognized is not limitless, but even in complicated, multi-user applications, each user should be able to use distinctive digit caps 500 for each digit 540 of their hands.

Figure 5B:
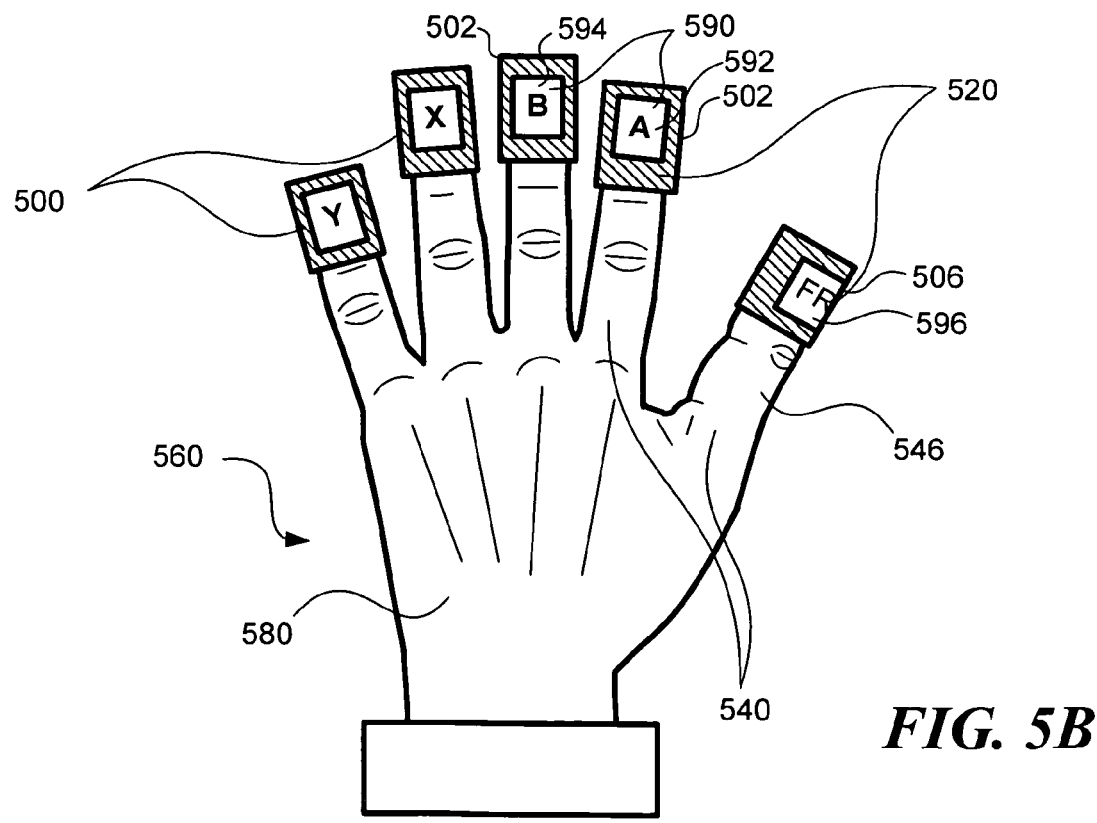

In FIG. 5B, upper surfaces 520 of digit caps 500 are illustrated with the digit caps disposed on digits 540. In this embodiment of the invention, it is not desired that digit caps 500 present optical codes on their upper surfaces 520. Just as a user does not engage a keyboard or a keypad with an upper side 580 of the user's hand, a user is not expected to engage an interactive display surface with upper surfaces 520 of digit caps 500. Instead, upper surfaces 520 of digit caps 500 preferably include human-visible identifiers 590 indicating the optical code that is disposed on underside 510 (FIG. 5A) of each digit cap 500.

For example, optical code A may correspond with function A in an application, just as function keys on a keyboard or labeled keys on a keypad are associated with a particular function in a software application. Accordingly, upper surface 520 of a digit cap 502 having on its underside an optical code (not shown) corresponding to function A may bear an identifier A (reference number 592). Similarly, upper surface 520 of a digit cap 504 having on its underside an optical code (not shown) corresponding to function B may bear the identifier B (reference number 594), etc. It also should be appreciated that, if digit caps 500 are associated with a particular application, identifiers 590 may carry an application/function-specific identifier. For example, if the application with which digit caps 500 are associated is game application 410 (FIGS. 4A-4C), the digit cap bearing the identifier associated with the optical code to fire weaponry 506, which is worn on user's thumb 546, may carry application/function-specific identifier 596 (or "FR") to inform the user of the function of digit cap 596 in the game application. It will be appreciated that identifiers 590 need not be alphanumeric. Identifiers 590 can also be pictures, symbols, or any other designation that will help a user to identify and distinguish between digit caps 500 having optical codes associated with different functions. Similarly, digit caps 500 can be colored differently or have different patterns or upper shapes to represent their associated functions. Further, because it is possible that there will be multiple sets of digit caps 500 to enable multiple users to engage a single application, the identifiers 590 or digit cap 500 colors may be used to signify digit caps 500 comprising a set of digit caps that are intended to be affixed to the digits of a single user.

It should be appreciated that digit caps also give the user flexibility in terms of digits 540 that will be used to control the different functions associated with each of digit caps 500. For example, as mentioned previously, if an application involves only two functions and thus, two digit caps 500, the user might choose to wear one digit cap 500 on one digit of each hand. Alternatively, one user might wear one of digit caps 500 to control one function, while giving the other digit cap 500 to another user to control the other function. Also, if a user is comfortable using a particular digit 540 for a particular function, a user can dispose digit caps 500 on whichever digits 540 the user chooses. Such key mapping and key remapping is available in many applications, but here a user can choose to map or remap keys merely by rearing placement of digit caps.

Figure 6A:
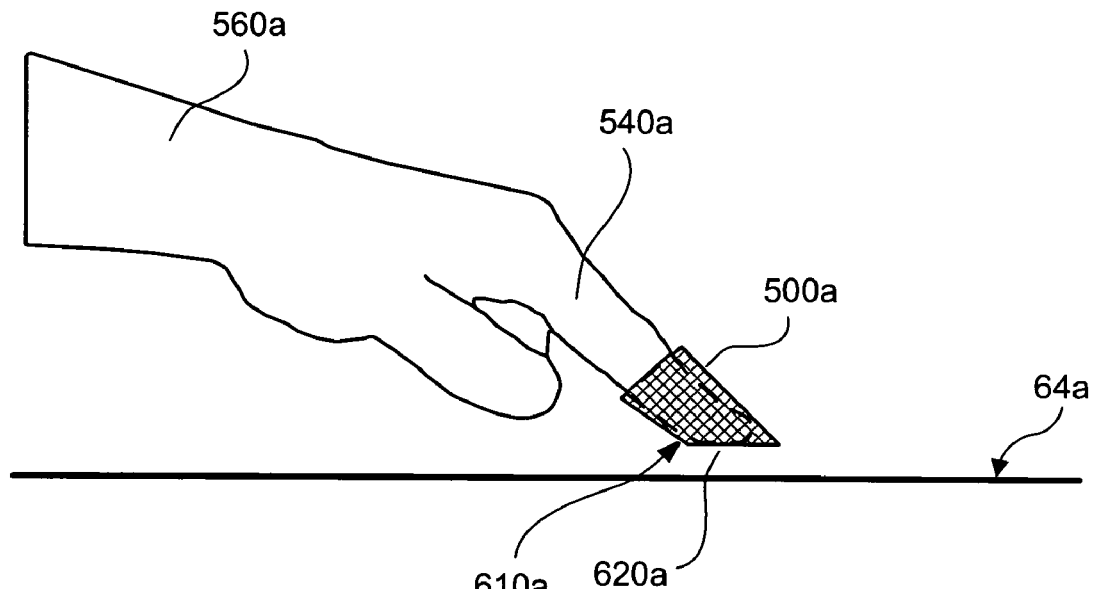
FIGS. 6A-6B are side views of the embodiment of the invention illustrated in FIGS. 5A-5B in which the user provides input to an application executing on the interactive display surface by moving a digit cap adjacent to the interactive display surface.
Figure 6B:
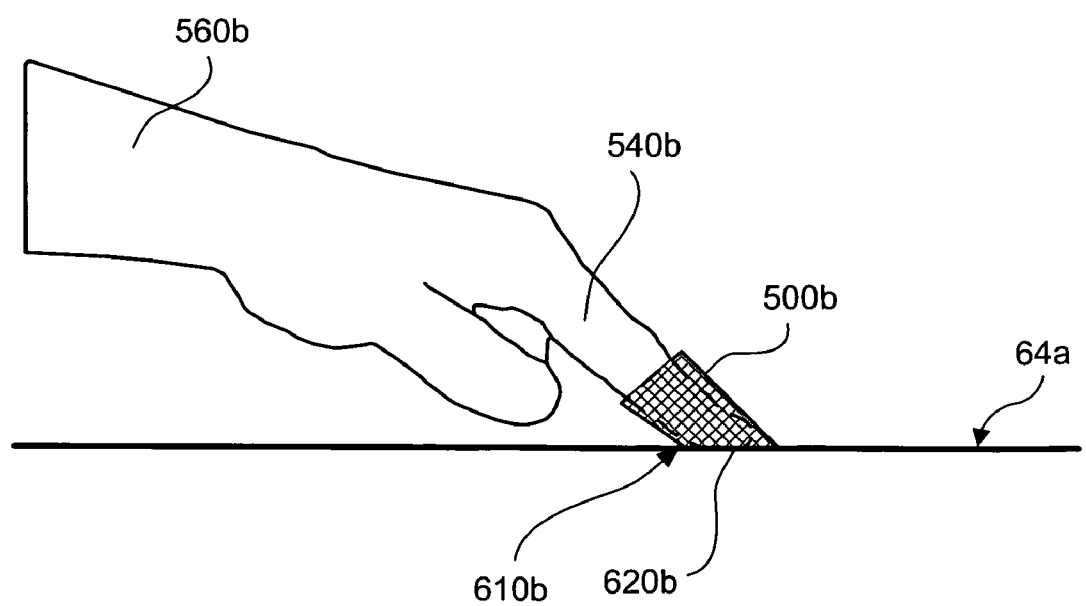

FIGS. 6A and 6B illustrate another embodiment of digit caps 500 and show another way in which the digit caps can be used with interactive display surface 64a. In this embodiment of the present invention, undersides 610a and 610b of digit caps 500a and 500b include generally flat tips 620a and 620b to support the optical codes (not shown) that are readable by IR video camera 68 (FIG. 2). Flat tips 620a and 620b are configured to present the optical codes fully to interactive display surface 64a to help facilitate detection and identification. As previously described in connection with FIG. 2, beneath interactive surface 64a is a translucent layer 64b, comprising a sheet of vellum or other suitable translucent material with light diffusing properties. As a result, IR video camera 68 may not detect or recognize some removed to great a distance away from interactive display surface 64a, but will recognize objects placed directly on or relatively close to interactive display surface 64a. Thus, the flat surface of flat tips 610a and 610b, which is more directly in contact with interactive display surface 64a, can be employed to help facilitate recognition of the optical code applied to the flat surface. It should be appreciated the elastomeric construction of digit caps 500a and 500b provides some flexibility to digit caps 500a and 500b to more readily enable flat tips 620a and 620b on undersides 610a and 610b to fully contact interactive display surface 64a.

In FIG. 6A, user's hand 560a and a digit 540a supporting digit cap 500a hover above interactive display surface 64a, indicating the user is waiting to invoke a program function with that digit. At a certain distance from interactive display surface 64a, the optical code (not shown) on flat tip 620a of digit cap 500a will not be read by interactive display surface 64a. This distance is adjustable by modifying a touch threshold of the interactive display surface (or within the application executing on interactive display surface 64a). Thus, FIG. 6A shows a situation in which user's hand 560a is poised with digit 540a ready to initiate an action by touching digit cap 500a to the interactive display surface, but has not yet done so. On the other hand, in FIG. 6B, user's hand 560b and/or digit 540b have been moved downwardly to place the optical code (not shown) on flat tip 620b of digit cap 500b in contact with interactive display surface 64a and thereby invoke a function associated with the optical code. In sum, FIGS. 6A and 6B illustrate how a user wearing one or more digit caps 500a and 500b with appropriate optical codes can engage interactive display surface 64a to invoke corresponding application functions.

Figure 7:
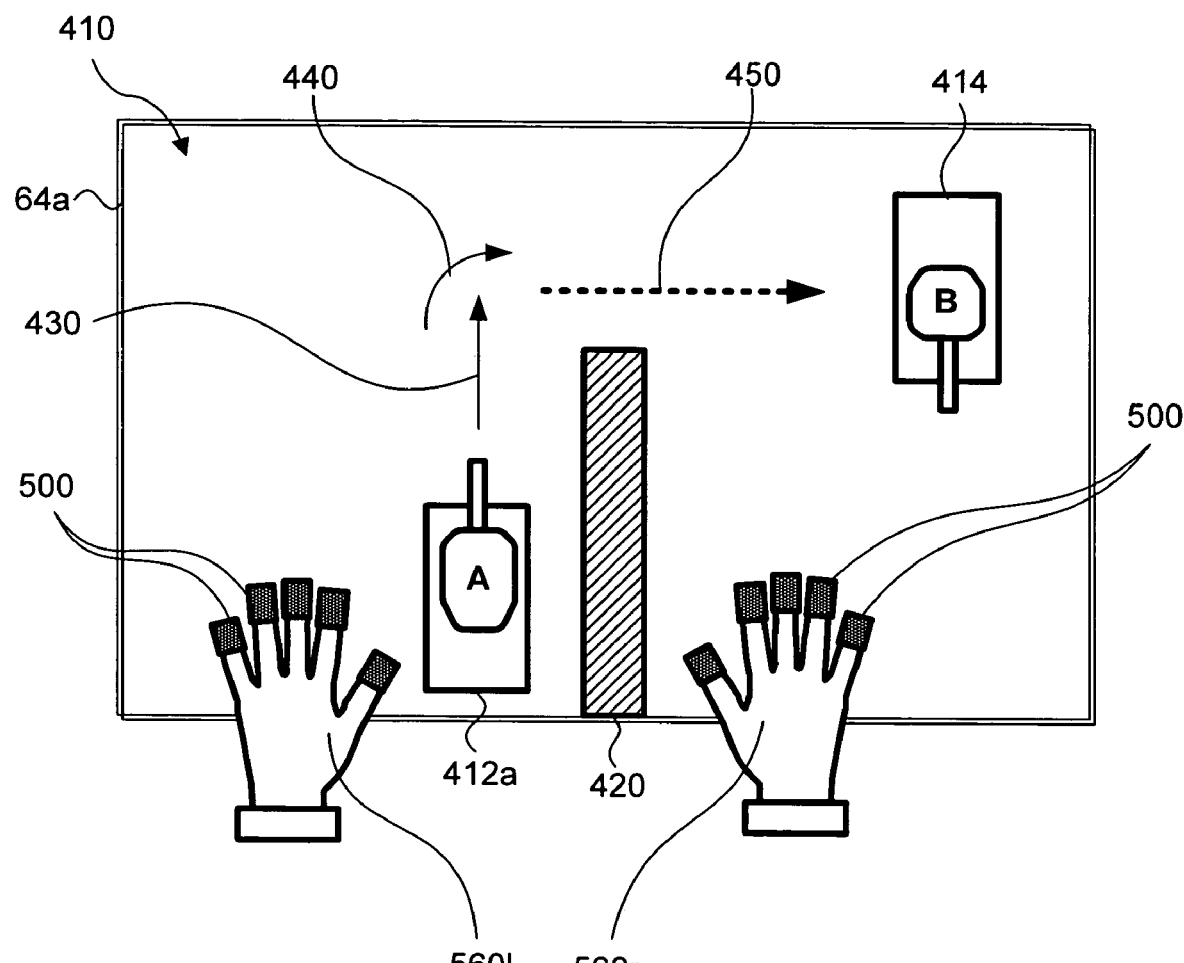
FIG. 7 illustrates how a user can employ the digit caps illustrated in FIGS. 5A-5B to control multiple attributes of the application illustrated in FIGS. 4A-4C by moving the user's digits relative to the interactive display surface.

FIG. 7 again illustrates exemplary game application 410 that was shown in FIGS. 4A-4C. In FIG. 7, however, the user engages interactive display surface 64a with user's right hand 560r and left hand 560l, both supporting a plurality of digit caps 500. Digit caps 500 are associated with application functions used to move User A's tank 412a in the directions indicated by arrows 430 and 440, and fire weapons in the direction of arrow 450. Since the present invention is not limited by the constraints of a virtual keypad or keyboard, the user can move hands 560r and 560l around on interactive display surface 64a as the user wishes—for comfort, to avoid occluding the view of images projected on interactive display surface 64a, or for any other reason. As described in connection with FIGS. 5A and 5B, the user invokes functions by positioning digits supporting digit caps 500, which are associated with the functions, so that the digit caps are adjacent to interactive display surface 64a, for example, by moving digits of user's hands 560r and 560l to press digit caps 500 against interactive display surface 64a. While not shown, it will be appreciated that tank 414 is similarly controlled by user B, who is also engaging interactive display surface 64a, by positioning hands and digits supporting digit caps on interactive display surface 64a at another point, whether next to, across from, or otherwise, relative to user A.

It should be appreciated that use of digit caps 500 is not limited to game application 410, but can be used for almost any application in which a user input is employed to initiate an action or function or to make a selection among a plurality of options. Digit caps 500 can have optical codes that are associated with alphanumeric characters for typing, tones for creating music, colors and patterns for creating images, or any other type of action, entity, or function that might be employed in an application.

Exemplary Types of Optical Codes Usable to Provide Input

Any type of optical code recognizable by a camera, either in the IR spectrum (or otherwise, if a different waveband is employed in the vision sensing system), may be used in embodiments of the present invention to provide input to an application executing on an interactive display surface. So long as the optical code is detectable by the interactive display surface and is associated or associable with actions or functions, any optical coding scheme can be used. Exemplary embodiments of a method and system for detection of optical codes are described in co-pending, commonly assigned U.S. patent application Ser. No. 10/814,577, entitled "Identification Of Object On Interactive Display Surface By Identifying Coded Pattern," which was filed on Mar. 31, 2004, the disclosure of the specification and drawings of which are hereby specifically incorporated herein by reference.

Figure 8A:
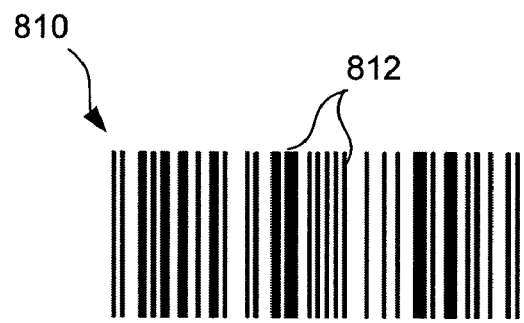
FIGS. 8A-8C illustrate some examples of optical encoding schemes that may be associated with portions of a user's hand in order to provide input to an application executing on the interactive display surface.
Figure 8B:
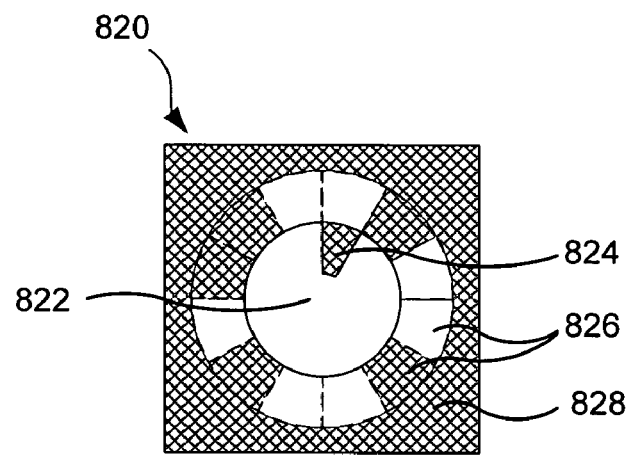
Figure 8C:
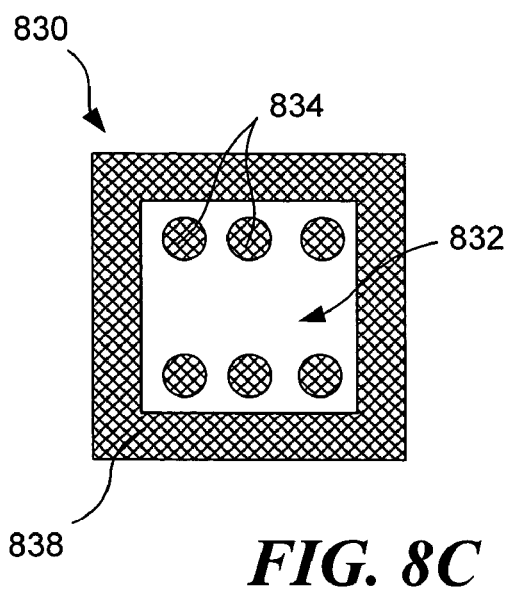

FIGS. 8A-8C provide three examples of optical codes suitable for use in connection with the present invention. As shown in FIG. 8A, a conventional bar code 810 can be used as the optical code applied to a digit cap. Again, bar code 810 may be presented to be read in any spectrum detectable by the interactive display surface, whether the bar code 810 can be discerned by the human eye or not. The sequence and width of bars 812 in the bar code 810 represent a value that can be detected by the vision sensing system of the interactive display surface. The value encoded in bar code 810 may be associated or associable with a function, action, or other entity in an application executing on the interactive display table. Positioning bar code 810 in contact with interactive display surface 64a thus invokes the associated function, action, or entity, as described above.

FIG. 8B illustrates a radial code 820. Radial code 820 includes a light reflective inner circular area 822 with a darkened start bit 824 (the inverse of the reflective and the darkened areas noted can alternatively be used in almost any of these optical codes). Start bit 824 is preferably located at a predefined first radius from the center of the coded region, and can take the shape of a keystone, a pie slice, or any other shape that makes the start bit easy to locate. Start bit 824 within light reflective inner circular area 822 defines a starting reference point from which the code value can be determined. Radial code 820 also comprises an outer, evenly divided first annulus 826 with a series of light and dark keystone-shaped data bits presenting the value of radial code 820. The value of radial code 820 is read starting from the location of the start bit 824 in a predefined clockwise (or alternatively, in a predefined counterclockwise) direction. An outer area 828 sets off radial code 820 from surrounding portions of the image or other optical codes to facilitate detection and identification.

FIG. 8C illustrates a matrix code 830. Matrix code 830 is an exemplary form of a matrix code in the form of a die matrix code having from one to six data bits 832 or die spots arranged in six predetermined patterns within a 3×3 grid 834. Data bits 832 are read from grid 834 and compared to each of six allowable die face patterns as well as to one or more versions of the die face patterns rotated by some predefined angle, e.g., 45°, relative to the patterns shown in FIG. 8C. A matrix codes 830 of almost any size and associated die face bit pattern can be read. An outer area 836 sets off matrix code 830 from surrounding portions of the image or other optical codes to facilitate detection and identification.

Other encoding schemes, such as a gray scale code scheme, and any other form of optical encoding can be used on digit caps. Any optical encoding scheme presenting codes that are optically identifiable and distinguishable, and which are associable with application functions, action, or entities are usable with the present invention.

Alternative Forms of Disposing Optical Codes on Portions of a User's Hand

Digit caps 500 were described in connection with FIGS. 5A and 5B, FIGS. 6A and 6B, and FIG. 7 as one exemplary way to affix optical codes to a user's hand so that the user can invoke application functions, action, or other entities simply by moving the optical codes adjacent to the interactive display surface. However, digit caps 500 are only one way by which optical codes may be presented to an interactive display surface in accordance with the present invention. Almost any approach for affixing optical codes to a user's hand can be employed to practice the present invention.

Figure 9A:
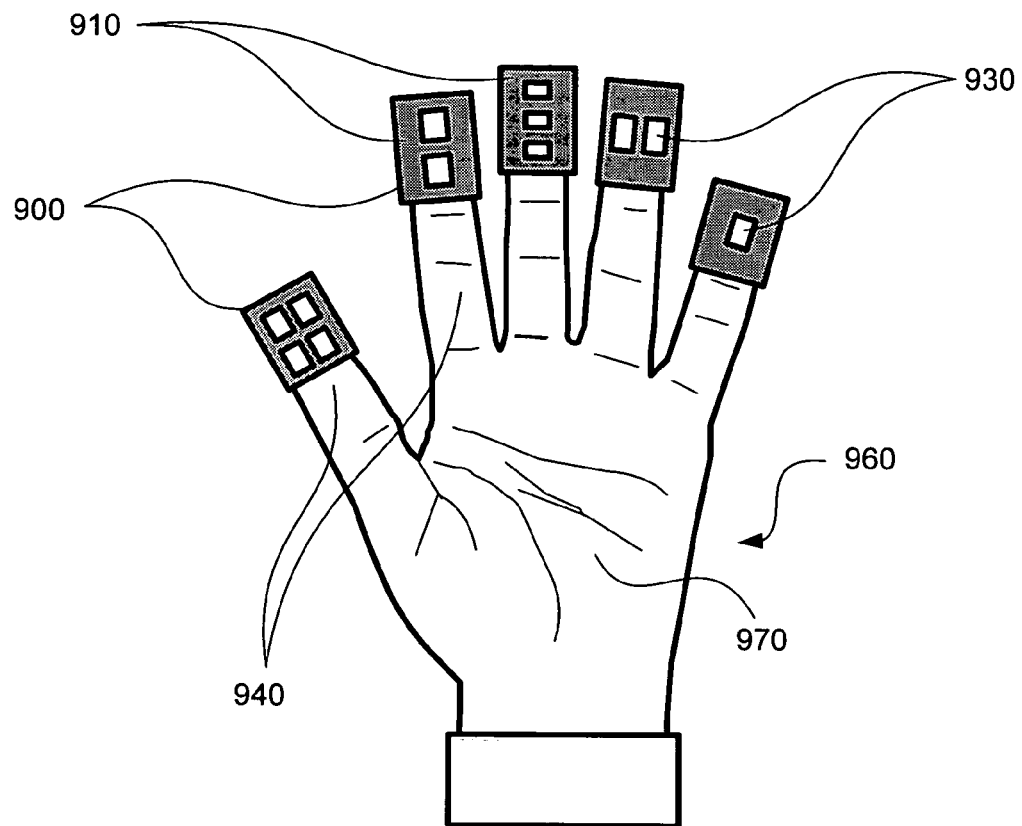
FIGS. 9A-9B illustrate alternative ways of attaching optical codes to digits of a user's hand without using digit caps.
Figure 9B:
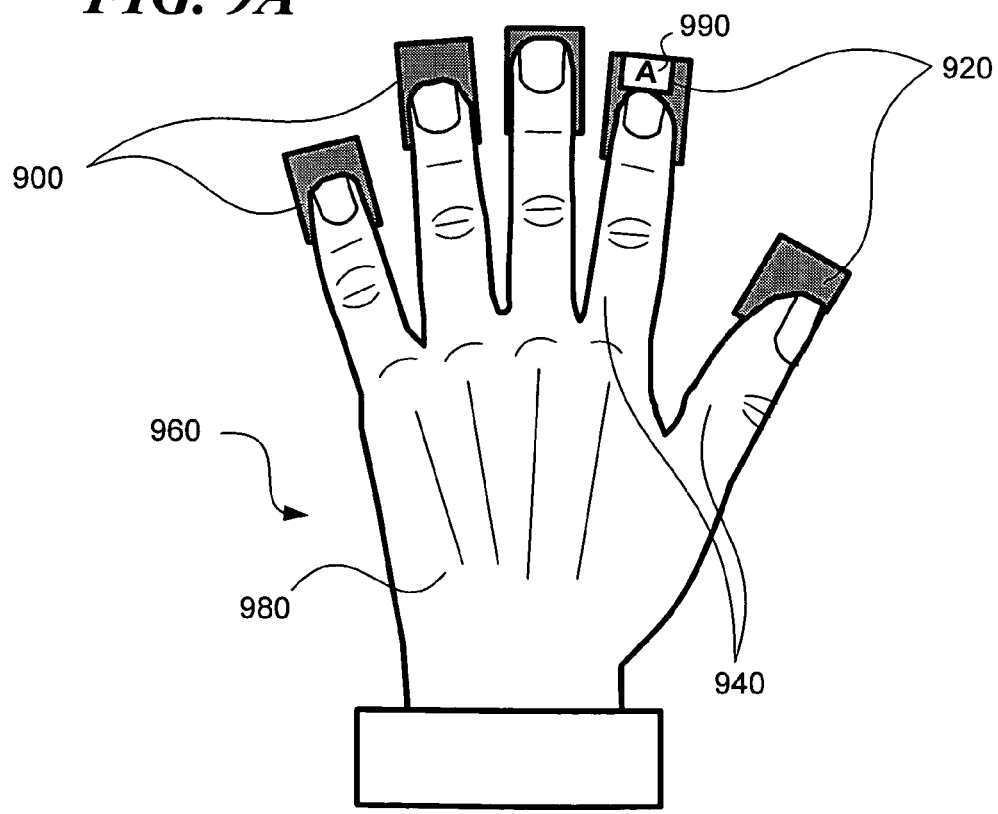

For example, FIGS. 9A and 9B illustrate digit tabs 900 that, on undersides 910, present optical codes 930 that are affixed to digits 940 of user's hand 960. In FIG. 9A, a palm side 970 of user's hand 960 presents optical codes 930 on digits 940 of user's hand 960, just as digit caps (FIG. 5A) presented optical codes 530 to the interactive display surface when placed in contact therewith. However, in contrast with digit caps 500, digit tabs 900 do not encase the tips of user's digits 940. As shown in FIG. 9B, digit tabs 900 are affixed to user's digits 940 with a temporary, single-use or reusable adhesive (not separately shown) that joins upper sides 920 of digit tabs 900 to user's digits 940. Identifiers, such as identifier 900 disposed on an upper side 920 of digit tab 900 may identify the optical code (not shown) presented by each digit tab 900 to the interactive display surface. Digit tabs 900 might also include generally planar tabs (such as a planar tab 990) that on their upper surface, or attachable to digits 940, or be provided in the form of an adhesive transfer to adorn the tips of the user's digits without using a substrate, as shown in FIGS. 9A and 9B. One advantage of digit tabs 900 is that they may be printable or reprintable on a laser or inkjet printer on demand, permitting their easy generation or replacement.

Figure 10A:
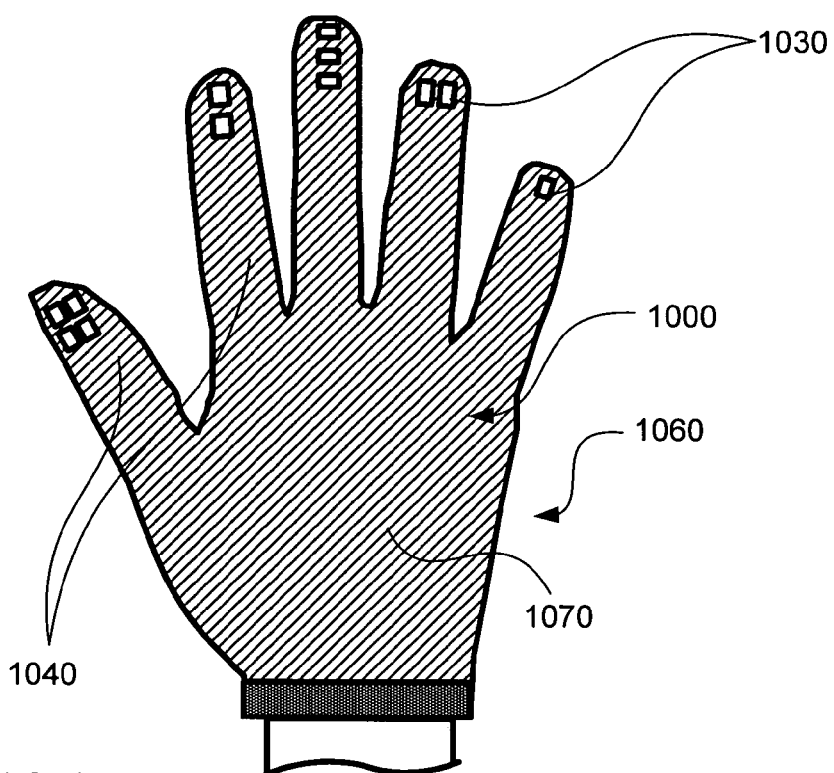
FIGS. 10A-10B illustrate alternative ways of attaching optical codes to portions of a user's hand by using a hand covering.
Figure 10B:
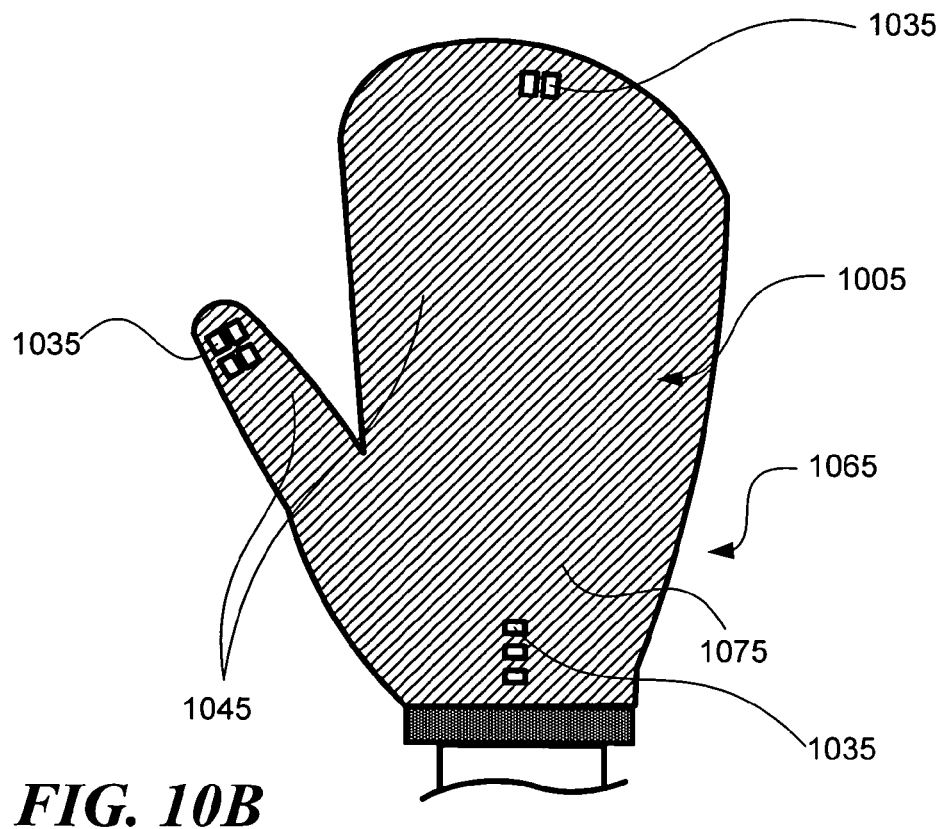

In addition, optical codes may be disposed on all or part of a user's hand by affixing the optical codes on hand coverings, such as shown in FIGS. 10A and 10B. FIG. 10A shows a glove 1000 worn on a user's hand 1060. On a palm side 1070 of glove 1000, optical codes 1030 are affixed on user's digits 1040. Alternatively, as shown in FIG. 10B, optical codes 1035 may be affixed to different positions on the undersurface of a mitt or mitten 1005. As previously described, not all applications involve a user desiring to enter input with all ten digits of both hands, or even all five digits of a single hand. Accordingly, mitten 1005 may have a few optical codes 1035 positioned at regions 1045 of a palm side 1075 of a user's hand 1065. It should be noted that in a further embodiment that is not shown, rather than being affixed to hand-encasing mitt or a mitten 1005, optical codes 1035 can instead be arranged and affixed on a panel attachable by a strap, adhesive, or other suitable attachment mechanism to a palm side of a user's hand, so that the optical codes can selective be used to provide input to an application executing on interactive display surface 64a by bringing a specific optical code into contact with the interactive display surface.

Creation, Use, and Response to Optical Codes

Figure 11:
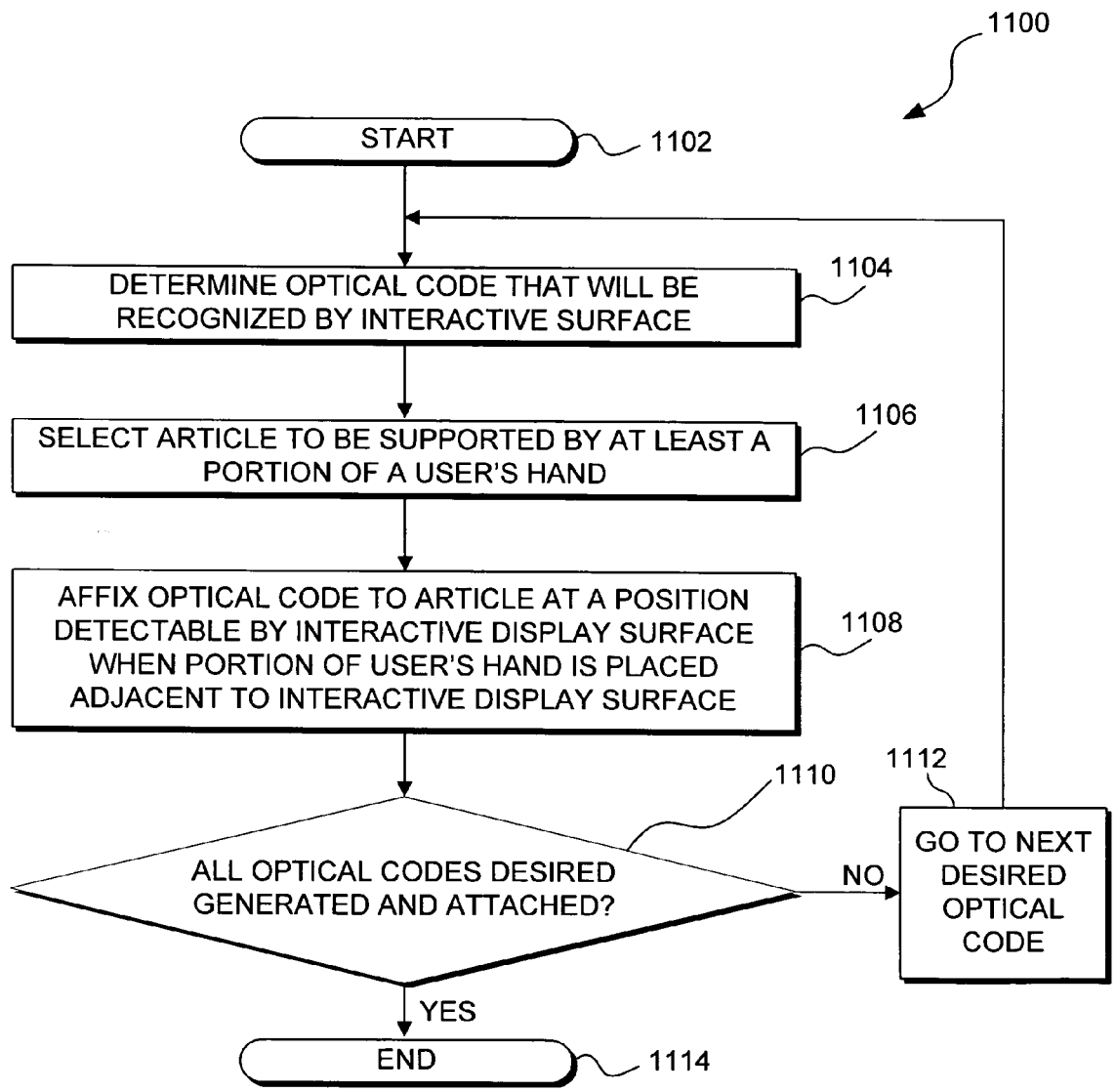
FIG. 11 is a flow diagram illustrating the logical steps of determining optical codes and attaching them to portions of a user's hand.

In FIG. 11, a flow diagram 1100 illustrates the logical steps for creating optical codes and disposing them on a user's digits to provide input to an interactive display surface. Flow diagram 1100 begins at a step 1102. At a step 1104, an optical code recognizable by the interactive display surface and its associated computer system (e.g., PC 20 in FIGS. 1-3), is determined. At a step 1106, an article that will be supported by a user's hand in providing input to the application is selected. At a step 1108, the optical code is affixed to the article at a position detectable by the interactive display surface when a portion of the user's hand is positioned adjacent to the interactive display surface.

The optical code can be affixed to the article using any number of techniques. In the case of digit caps 500 (FIG. 5A), the optical code can be printed or deposited onto ends of the digit caps, or otherwise molded or formed in the surface of the digit caps. Alternatively, the optical codes can be formed on an intermediate substrate or layer that is then joined to the surface of the digit caps. Similarly, using digit tabs (FIG. 9A), the optical codes can be printed, deposited, molded, or formed on one side of the digit tab, with an opposite side being adhesively attachable to the user's digits. Also, the optical codes can be formed directly onto a glove, mitten, mitt, or panel, or separately formed and then attached to a glove, mitten, mitt, or panel.

Referring again to flow diagram 1100, at a decision step 1110, it is determined if all optical codes desired have been generated and attached to an article suitable for affixing the optical codes to the user's hand. If not, at a step 1112, flow diagram 1100 proceeds to a next desired optical code and loops to step 1104 to determine the next recognizable optical code. Once it is determined at decision step 1110 that all the desired optical codes have been generated, flow diagram 1100 ends at a step 1114.

In FIG. 12, a flow diagram 1200 illustrates the logical steps for deploying and using optical codes on portions of a user's hand. Flow diagram 1200 begins at a step 1202. At a step 1204, optical code bearing articles are deployed on portions of a user's hand. In the case of digit caps 500 (FIG. 5A), the caps are fit into place on desired digits of the user's hand or hands. In the case of digit tabs 900 (FIG. 9A), the tabs are adherently affixed to the desired portions of the user's hand(s). Also, in the case of glove 1000 (FIG. 10A) or mitt, mitten, or panel 1005 (FIG. 10B), the hand covering is positioned as desired on the user's hand.

At a step 1206, the user's hand(s) supporting optical code-bearing article(s) is/are positioned within reach of the interactive display surface so that the user will be ready to present an input to the interactive display surface, as described above. At a step 1208, the optical code-responsive application is executed on the interactive display surface (if not already executing). At a decision step 1210, the logic determines if the user has provided any input to the application by positioning an optical code adjacent to the interactive display surface. If not, flow diagram 1200 proceeds to a decision step 1214, where it is determined if the execution of the application is continuing. If so, the flow diagram loops back to decision step 1210, to await input from the user in accord with this invention. On the other hand, if it is determined at decision step 1210 that user input has been provided by the user positioning the optical code in contact with the interactive display surface, at a step 1212, the interactive display table responds to optical code that was input by the user moving hand(s)/finger(s) so as to position the optical code affixed thereto in contact with the interactive display surface. Flow diagram 1200 then proceeds to decision step 1214 to determine if the application is continuing to execute, as previously described. Once it is determined that application execution is no longer continuing, flow diagram 1200 ends at a step 1216.

In FIG. 13, a flow diagram 1300 illustrates the logical steps corresponding to details of the interactive display table responding to optical codes presented on the interactive display surface (i.e., details of step 1212 in FIG. 12). Flow diagram 1300 begins at a step 1302. At a step 1304, an optical code-responsive application is being executed on the interactive display surface, possibly in response to a user directive as noted at step 1208 of flow diagram 1200 (FIG. 12). At a step 1306, the interactive display surface is monitored to detect the presentation of optical codes, e.g., by detecting IR light from an IR source 66 (FIG. 2) that is reflected from the optical code that the user has presented to the interactive display surface, as described above.

At a decision step 1308, it is determined if an optical code has been detected. If not, flow diagram 1300 proceeds to a decision step 1320 to determine if the application is continuing to execute. If so, flow diagram 1300 loops back to step 1306 to monitor the surface for presentation of any optical codes by the user. On the other hand, if it is determined at decision step 1308 that an optical code has been detected, at a step 1310, the value represented by the optical code is decoded from the optical code presented. At a decision step 1314, it is determined if the optical code detected is appropriate for the current application (or its current state). For example, if a user places an object presenting an optical code intended for another application (or an optical code that is inappropriate for a current point in the execution of the application) on the interactive display surface, the application should not respond to the optical code. If the optical code detected is inappropriate, flow diagram 1300 proceeds to decision step 1320 to determine if the application is continuing to execute. However, if it is determined at the decision step 1314 that the optical code detected is appropriate for the application, at a step 1316, an appropriate response to the presentation of the optical code is determined, and at a step 1318, the response determined is executed.

Once the response is executed at step 1318, at a decision step 1320, it is again determined if application execution continues. If so, flow diagram 1300 again loops to step 1306. On the other hand, if it is determined at the decision step 1320 that application execution is not continuing, flow diagram 1300 ends at step 1322.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for providing an input to an application executing on a computer system having an interactive display surface, comprising the steps of:
   (a) providing a digital video camera mounted behind the display surface, the display surface being translucent, the digital video camera being responsive to infrared (IR) light and the digital video camera being responsive only to IR light reflected from an article in contact with or a short distance above the display surface;
   (b) providing an infrared (IR) light source comprising a plurality of IR light emitting diodes (LEDs) mounted such that the IR light produced by the LEDs is directed toward the underside of the display surface;
   (c) disposing a baffle between the IR light source and the digital video camera to prevent IR light that is directly emitted from the IR light source from entering the digital video camera;
   (d) associating a set of orthogonal X and Y axes with the display surface;
   (e) determining an identifying code selected to be detectable by the interactive display surface when the identifying code is positioned adjacent to the interactive display surface by a user engaging the interactive display surface;
   (f) selecting an article, the article being configured to be removably affixed to at least a portion of a user's hand so that the article need not be grasped by the user when engaging the interactive display surface; and
   (g) providing the identifying code on the article, such that when the article is positioned adjacent to the interactive display surface by the user appropriately moving the at least the portion of the user's hand, the interactive display surface detects the identifying code.

2. The method of claim 1, wherein the identifying code includes at least one of a bar code, a matrix code, a radial code, a gray scale code, an identifiable color, and a distinctive shape.

3. The method of claim 1, wherein the identifying code is associated with a response in the application, further comprising the step of invoking the response upon detecting the identifying code positioned adjacent to the interactive display surface.

4. The method of claim 1, wherein the article includes a digit cap configured to be worn on an end of a user's digit.

5. The method of claim 1, wherein the article includes a layer configured with a first surface that is removably adhered to a user's digit, and a second surface that is opposite the first surface and is provided with the identifying code.

6. The method of claim 1, wherein the article includes a hand covering configured to cover at least a portion of a palm of a user's hand.

7. The method of claim 6, wherein the hand covering includes one of a glove, a mitten, a mitt, and a panel attachable to the user's hand.

8. The method of claim 6, further comprising the steps of
   (a) providing a plurality of identifying codes at a plurality of locations on the hand covering, each of the plurality of identifying codes being associated with a different response in the application; and
   (b) invoking a response associated with the identifying code provided at a location upon detecting the identifying code at the location positioned adjacent to the interactive display surface, by the user's hand.

9. The method of claim 1, wherein the identifying code is provided on the article by at least one of the steps of forming, molding, printing, and depositing the identifying code on the article.

10. The method of claim 1, wherein the identifying code is provided on the article by forming the identifying code on an intermediate medium and attaching the intermediate medium to the article.

11. A method for providing an input to an application executing on a computer system coupled with an interactive display surface, the method comprising the steps of:
   (a) providing a digital video camera mounted behind the display surface, the display surface being translucent, the digital video camera being responsive to infrared (IR) light and the digital video camera being responsive only to IR light reflected from an article in contact with or a short distance above the display surface;
   (b) providing an infrared (IR) light source comprising a plurality of IR light emitting diodes (LEDs) mounted such that the IR light produced by the LEDs is directed toward the underside of the display surface;
   (c) disposing a baffle between the IR light source and the digital video camera to prevent IR light that is directly emitted from the IR light source from entering the digital video camera;
   (d) associating a set of orthogonal X and Y axes with the display surface;
   (e) determining an optical code selected to be identifiable by the interactive display surface when the optical code is positioned adjacent to the interactive display surface;
   (f) disposing the optical code on a portion of a user's hand;
   (g) configuring the application to invoke a particular response upon detection of the optical code adjacent to the interactive display surface;
   (h) detecting the optical code when the optical code is positioned adjacent to the interactive display surface as a result of a movement of the user's hand; and
   (i) invoking the response upon detection of the optical code.

12. The method of claim 11, further comprising the steps of:
  (a) determining a plurality of optical codes configured to be identifiable by the interactive display surface when each optical code is positioned adjacent to the interactive display surface;
  (b) disposing the plurality of optical codes at a plurality of portions of a user's hand;
  (c) configuring the application to invoke a specific response upon detection of any of the plurality of optical codes adjacent to the interactive display surface, each optical code being associated with a different specific response;
  (d) detecting any of the plurality of optical codes that is moved to a position adjacent to the interactive display surface as a result of a movement of the user's hand; and
  (e) invoking each specific response associated with any of the optical codes that were thus detected.

13. The method of claim 11, wherein the optical code includes at least one of a bar code, a matrix code, a radial code, a gray scale code, an identifiable color, and a distinctive shape.

14. The method of claim 11, wherein the optical code is selected to be detectable in response to infrared light reflected by the optical code.

15. The method of claim 11, wherein the optical code is disposed on the portion of the user's hand by:
  (a) selecting an article, the article being configured to be removably affixed to at least a portion of a user's hand;
  (b) providing the optical code on the article; and
  (c) removably affixing the article to the portion of the user's hand.

16. The method of claim 15, wherein the article includes a digit cap configured to be worn on an end of a user's digit.

17. The method of claim 15, wherein the article includes a layer having a first surface configured to be removably adhered to a user's digit, and having a second surface provided with the optical code that is detectable when positioned adjacent to the interactive display surface.

18. The method of claim 15, wherein the article includes a hand covering configured to cover at least a portion of a palm of a user's hand.

19. The method of claim 18, wherein the hand covering includes one of a glove, a mitten, a mitt, and a panel attachable to the user's hand.

20. The method of claim 18, further comprising the steps of
  (a) providing a plurality of different optical codes at a plurality of locations on the hand covering, each of the plurality of different optical codes being associated with a corresponding different response in the application being executed;
  (b) detecting any of the plurality of different optical codes being positioned adjacent to the interactive display surface; and
  (c) carrying out each response associated with any of the plurality of different optical codes that was thus detected.

21. The method of claim 15, wherein the optical code is provided on the article by at least one of the steps of forming, molding, printing, and depositing the optical code on the article.

22. The method of claim 15, wherein the optical code is provided on the article by forming the optical code on an intermediate medium and attaching the intermediate medium to the article.

23. A system for providing an input to an application executing on a computer system coupled with an interactive display surface, the system comprising:
  (a) an identifying code selected to be detectable by the interactive display surface when the identifying code is positioned adjacent to the interactive display surface;
  (b) an attachment device adapted to removably affix the identifying code to a portion of a user's hand
  (c) a digital video camera mounted behind the display surface, the display surface being translucent, the digital video camera being responsive to infrared (IR) light and the digital video camera being responsive only to IR light reflected from an article in contact with or a short distance above the display surface;
  (d) an infrared (IR) light source comprising a plurality of IR light emitting diodes (LEDs) mounted such that the IR light produced by the LEDs is directed toward the underside of the display surface;
  (e) a baffle disposed between the IR light source and the digital video camera to prevent IR light that is directly emitted from the IR light source from entering the digital video camera; and
  (f) a set of orthogonal X and Y axes associated with the display surface.

24. The system of claim 23, wherein the identifying code includes at least one of a bar code, a matrix code, a radial code, a gray scale code, an identifiable color, and a distinctive shape.

25. The system of claim 23, wherein the identifying code is associated with a response in the application, said response being invoked upon the IR light sensor detecting the IR light reflected by the identifying code positioned adjacent to the interactive display surface.

26. The system of claim 23, wherein the attachment device includes a deformable digit cap adapted to be worn on an end of a user's digit.

27. The system of claim 23, wherein the attachment device includes a layer having a first surface adapted to be removably adhered to a user's digit, and a second surface on which the identifying code is provided.

28. The system of claim 23, wherein the attachment device includes a hand covering adapted to cover at least a portion of a palm of a user's hand.

29. The system of claim 28, wherein the hand covering includes one of a glove, a mitten, a mitt, and a panel adapted to be attach to a user's hand.

30. The system of claim 28, wherein a plurality of different identifying codes are disposed at a plurality of locations on the hand covering, each of the plurality of different identifying codes being associated with a specific response in the application that is invoked upon detecting that a user's hand has positioned the identifying code associated with the response adjacent to the interactive display surface.

31. The system of claim 23, wherein the identifying code is provided on the attachment device by at least one of forming, molding, printing, and depositing the identifying code on the attachment device.

32. The system of claim 23, wherein the identifying code is provided on the attachment device by forming the identifying code on an intermediate medium and attaching the intermediate medium to the attachment device.

* * * * *